US012718047B2

(12) United States Patent
Yim et al.

(10) Patent No.: US 12,718,047 B2
(45) Date of Patent: Aug. 25, 2026

(54) FILE TRANSMISSION SYSTEM, ELECTRONIC DEVICE, AND FILE TRANSMISSION METHOD BY SAME ELECTRONIC DEVICE

(71) Applicant: Samsung Electronics Co., Ltd., Suwon-si (KR)

(72) Inventors: Jeeeun Yim, Suwon-si (KR); Eunha Choi, Suwon-si (KR); Hyeonseob Seo, Suwon-si (KR); Eunseok Hong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 19/032,821

(22) Filed: Jan. 21, 2025

(65) Prior Publication Data

US 2025/0165738 A1 May 22, 2025

Related U.S. Application Data

(63) Continuation of application No. PCT/KR2023/009526, filed on Jul. 5, 2023.

(30) Foreign Application Priority Data

Jul. 21, 2022 (KR) ........................ 10-2022-0090075
Sep. 1, 2022 (KR) ........................ 10-2022-0110981

(51) Int. Cl.
*G06K 19/06* (2006.01)
*G06F 3/04842* (2022.01)
(Continued)

(52) U.S. Cl.
CPC .... *G06K 19/06112* (2013.01); *G06F 3/04842* (2013.01); *G06F 3/14* (2013.01);
(Continued)

(58) Field of Classification Search
None
See application file for complete search history.

(56) References Cited

U.S. PATENT DOCUMENTS

2014/0273820 A1* 9/2014 Narayan ............... H04W 76/14 455/41.1
2015/0009152 A1* 1/2015 Tang .................. G06F 3/04883 345/173
(Continued)

FOREIGN PATENT DOCUMENTS

CN 110062438 A 7/2019
CN 111857498 A 10/2020
(Continued)

OTHER PUBLICATIONS

International Search Report dated Oct. 5, 2023, issued in International Application No. PCT/KR2023/009526.
(Continued)

*Primary Examiner* — Kristy A Haupt
(74) *Attorney, Agent, or Firm* — Jefferson IP Law, LLP

(57) ABSTRACT

A file transmission system is provided. The file transmission system includes a first electronic device for, in case that a second electronic device for file transmission is not found, generate quick response (QR) code data including information for changing the first electronic device to a sharing permitted target, and broadcast a packet for a QR code scan request, the second electronic device configured to, in case that the packet for the QR code scan request is received from the first electronic device, scan the QR code data of the first electronic device, and based on analysis of the scanned QR code data, provide a user interface (UI) enabling selection of a sharing option by which the first electronic device may be configured as a sharing permitted target.

17 Claims, 24 Drawing Sheets

(51) Int. Cl.
*G06F 3/14* (2006.01)
*G06K 7/14* (2006.01)
*H04M 1/72469* (2021.01)

(52) U.S. Cl.
CPC ..... *G06K 7/1417* (2013.01); *G06K 19/06037* (2013.01); *H04M 1/72469* (2021.01)

(56) References Cited

U.S. PATENT DOCUMENTS

2016/0323863 A1 11/2016 Park et al.
2017/0230537 A1 8/2017 Kawanishi
2017/0323024 A1 11/2017 Vecera et al.
2020/0045611 A1 2/2020 Wang et al.
2021/0127245 A1 4/2021 Park et al.
2021/0144780 A1 5/2021 Hao
2021/0250744 A1 8/2021 Kang et al.
2021/0410217 A1 12/2021 Yoon
2023/0269350 A1 8/2023 Lee et al.

FOREIGN PATENT DOCUMENTS

ES 2850280 A1 * 8/2021 ............ H04W 76/00
JP 2020-511908 A 4/2020
KR 10-2013-0023897 A 3/2013
KR 10-2021-0012973 A 2/2021
KR 10-2021-0049653 A 5/2021
KR 10-2021-0101496 A 8/2021
KR 10-2022-0060230 A 5/2022

OTHER PUBLICATIONS

Extended European Search Report dated Sep. 8, 2025, issued in a European Application No. 23843227.2.

* cited by examiner

FILE TRANSMISSION SYSTEM, ELECTRONIC DEVICE, AND FILE TRANSMISSION METHOD BY SAME ELECTRONIC DEVICE

CROSS-REFERENCE TO RELATED APPLICATION(S)

This application is a continuation application, claiming priority under 35 U.S.C. § 365 (c), of an International application No. PCT/KR2023/009526, filed on Jul. 5, 2023, which is based on and claims the benefit of a Korean patent application number 10-2022-0090075, filed on Jul. 21, 2022, in the Korean Intellectual Property Office, and of a Korean patent application number 10-2022-0110981, filed on Sep. 1, 2022, in the Korean Intellectual Property Office, the disclosure of each of which is incorporated by reference herein in its entirety.

BACKGROUND

1. Field

The disclosure relates to a file transmission system, an electronic device, and a method for transmitting a file by the electronic device, in which a reception side electronic device induces a transmission side electronic device to be configured as a sharing permitted target so that the reception side electronic device may receive a file transmitted from the transmission side electronic device.

2. Description of Related Art

A transmission side electronic device includes a file transmission function (e.g., a device-to-device (D2D) file transmission function) capable of searching for and connecting to a nearby reception side external electronic device so as to transmit a file to the reception side electronic device.

In order for the transmission side electronic device to transmit a file to the reception side electronic device by using the file transmission function, the reception side electronic device may configure the transmission side electronic device as a sharing permitted target.

For example, the reception side electronic device may configure the sharing permitted target by using an item selected by a user from a first item, a second item, and a third item among sharing options for configuring a sharing permitted target, wherein the first item is for disabling a sharing permitted target, the second item is for configuring only a contact stored in an address book to be a sharing permitted target, and the third item is for configuring all nearby electronic devices to be sharing permitted targets.

The reception side electronic device has the inconvenience of having to find and configure the sharing option in order to receive a file from the transmission side electronic device.

Therefore, when the first item for disabling a sharing permitted target is configured as default for the reception side electronic device, the transmission side electronic device is unable to search for a nearby reception side electronic device.

In addition, when the second item for configuring only a contact stored in an address book to be a sharing permitted target is selected by a user and configured for the reception side electronic device, if a phone number of the transmission side electronic device is not stored in an address book of the reception side electronic device, the transmission side terminal is unable to search for a nearby reception side electronic device.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a file transmission system, an electronic device, and a method for transmitting a file by the electronic device, in which a reception side electronic device induces a transmission side electronic device to be configured as a sharing permitted target so that the reception side electronic device may receive a file transmitted from the transmission side electronic device.

Additional aspects will be set forth in part in the description which follows and, in part, will be apparent from the description, or may be learned by practice of the presented embodiments.

In accordance with an aspect of the disclosure, a file transmission system is provided. The file transmission system includes a first electronic device configured to, in case that a second electronic device for file transmission is not found, generate quick response (QR) code data including information for changing the first electronic device to a sharing permitted target, and broadcast a packet for a QR code scan request, and the second electronic device configured to, in case that the packet for the QR code scan request is received from the first electronic device, scan the QR code data of the first electronic device, and based on analysis of the scanned QR code data, provide a user interface (UI) configured to enable selection of a sharing option allowing the first electronic device to be configured as a sharing permitted target.

In accordance with another aspect of the disclosure, an electronic device is provided. The electronic device includes communication circuitry, a display, memory storing one or more computer programs, and one or more processors communicatively coupled to the communication circuitry, the display, and the memory, wherein the one or more computer programs include the computer-executable instructions that, when executed by the one or more processors individually or collectively, cause the electronic device to broadcast a search request packet for searching for an external electronic device for file transmission via the communication circuitry, and in case that reception of a search response packet from the external electronic device fails, generate quick response (QR) code data including information for changing the electronic device to a sharing permitted target, broadcast a packet for a QR code scan request, and control the display to display the generated QR code data.

In accordance with another aspect of the disclosure, an electronic device is provided. The electronic device includes communication circuitry, a camera, a display, memory storing one or more computer programs, and one or more processors communicatively coupled to the communication circuitry, the camera, the display, and the memory, wherein the one or more computer programs include the computer-executable instructions that, when executed by the one or more processors individually or collectively, cause the electronic device to, in case that a packet for a quick response (QR) code scan request is received from an external electronic device via the communication circuitry, scan QR code data of the external electronic device via the camera, and based on analysis of the scanned QR code data, control the display to provide a user interface (UI) configured to enable selection of a sharing option allowing the external electronic device to be configured as a sharing permitted target.

In accordance with another aspect of the disclosure, a file transmission method performed by an electronic device is provided. The file transmission method includes broadcasting, by the electronic device, a search request packet for searching for an external electronic device for file transmission via communication circuitry of the electronic device, in case that reception of a search response packet from the external electronic device fails, generating, by the electronic device, quick response (QR) code data comprising information for changing the electronic device to a sharing permitted target, broadcasting, by the electronic device, a packet for a QR code scan request, and controlling, by the electronic device, a display to display the generated QR code data. The file transmission method includes, by the second electronic device, when the packet for the QR code scan request is received from the first electronic device, scanning the QR code data of the first electronic device, and based on analysis of the scanned QR code data, providing a UI configured to enable selection of a sharing option allowing the first electronic device to be configured as a sharing permitted target.

In accordance with another aspect of the disclosure, a file transmission method performed by an electronic device is provided. The file transmission method includes in case that a packet for a quick response (QR) code scan request is received from the external electronic device via communication circuitry of the electronic device, scanning, by the electronic device, the QR code data of the external electronic device via a camera of the electronic device, and based on analysis of the scanned QR code data, controlling, by the electronic device, the display to provide a user interface (UI) configured to enable selection of a sharing option allowing the external electronic device to be configured as a sharing permitted target.

According to the disclosure, when a nearby reception side electronic device is not detected by a transmission side electronic device, a transmission side electronic device may conveniently search for a reception side electronic device by inducing the reception side electronic device to select the transmission side electronic device as a sharing permitted target.

For example, the transmission side electronic device may conveniently search for a reception side electronic device by inducing the reception side electronic device to select the transmission side electronic device as a sharing permitted target by only scanning QR code generated by the transmission side electronic device.

According to the disclosure, when a second item for configuring only a contact stored in an address book to be a sharing permitted target is selected by a user and configured for the reception side electronic device, the reception side electronic device may store a phone number of the transmission side electronic device, which is not stored in an address book of the reception side electronic device, by only scanning the QR code generated by the transmission side electronic device, so that the transmission side electronic device may conveniently search for the reception side electronic device.

In accordance with another aspect of the disclosure, one or more non-transitory computer-readable storage media storing one or more computer programs including computer-executable instructions that, when executed by one or more processors of an electronic device individually or collectively, cause the electronic device to perform operations are provided. The operations include broadcasting, by the electronic device, a search request packet for searching for an external electronic device for file transmission via communication circuitry of the electronic device, in case that reception of a search response packet from the external electronic device fails, generating, by the electronic device, quick response (QR) code data comprising information for changing the electronic device to a sharing permitted target, broadcasting, by the electronic device, a packet for a QR code scan request, and controlling, by the electronic device, a display to display the generated QR code data.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

It should be appreciated that the blocks in each flowchart and combinations of the flowcharts may be performed by one or more computer programs which include instructions. The entirety of the one or more computer programs may be stored in a single memory device or the one or more computer programs may be divided with different portions stored in different multiple memory devices.

Any of the functions or operations described herein can be processed by one processor or a combination of processors. The one processor or the combination of processors is circuitry performing processing and includes circuitry like an application processor (AP, e.g. a central processing unit (CPU)), a communication processor (CP, e.g., a modem), a graphics processing unit (GPU), a neural processing unit (NPU) (e.g., an artificial intelligence (AI) chip), a Wi-Fi chip, a Bluetooth® chip, a global positioning system (GPS) chip, a near field communication (NFC) chip, connectivity chips, a sensor controller, a touch controller, a finger-print sensor controller, a display driver integrated circuit (IC), an audio CODEC chip, a universal serial bus (USB) controller, a camera controller, an image processing IC, a microprocessor unit (MPU), a system on chip (SoC), an IC, or the like.

Figure 1:
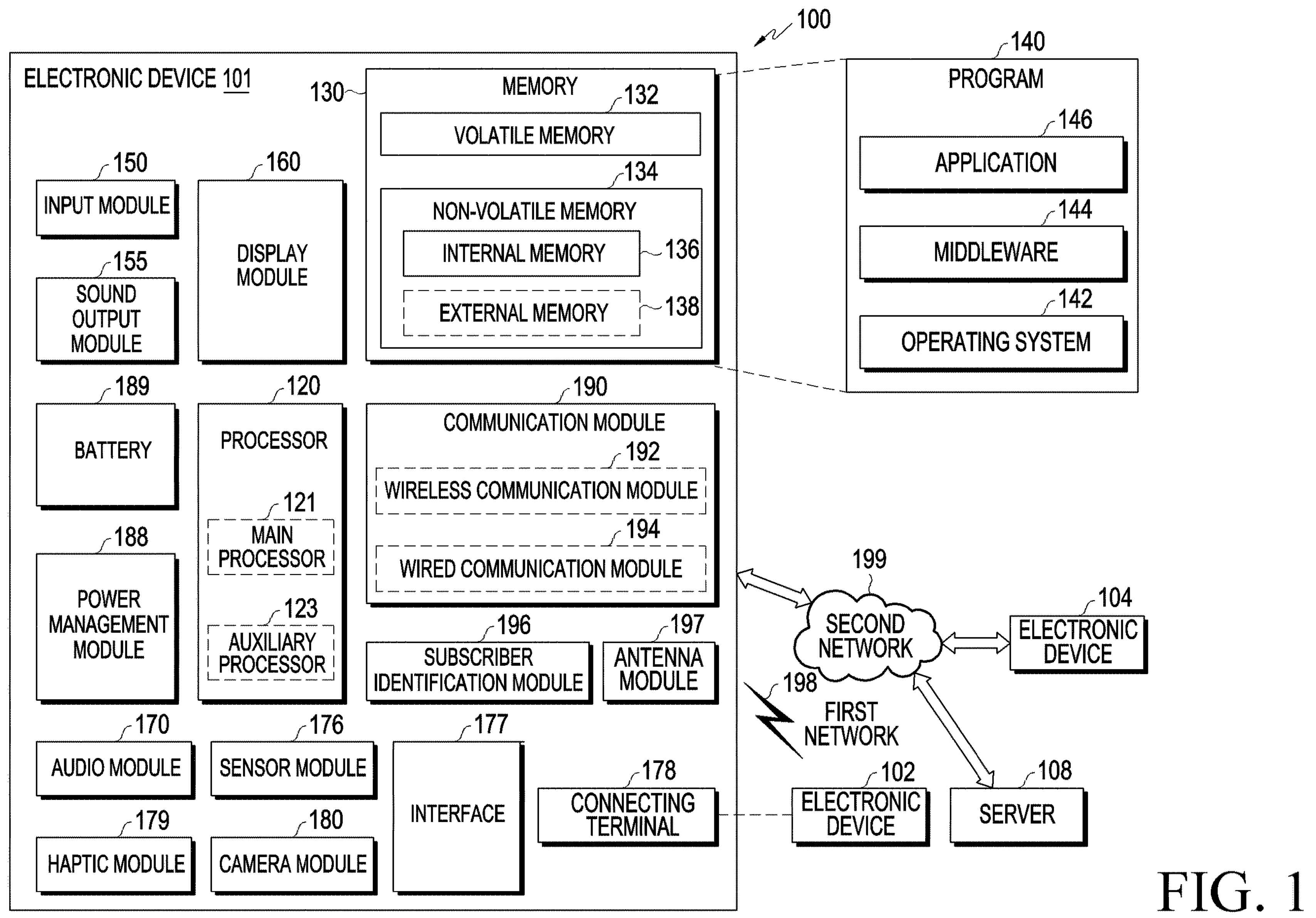
FIG. 1 is a block diagram of an electronic device in a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semisupervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™ wireless-fidelity (Wi-Fi) direct, or infrared data association (IrDA)) or the second network 199 (e.g., a long-range communication network, such as a legacy cellular network, a fifth generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter wave (mmWave) band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
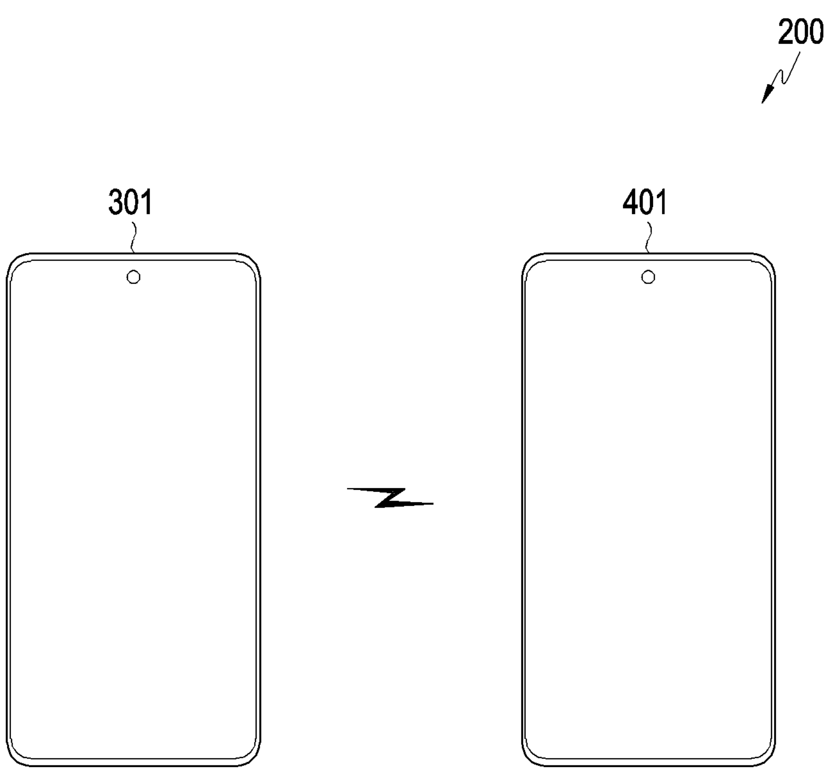
FIG. 2 is a diagram illustrating a system for file transmission according to an embodiment of the disclosure.

FIG. 2 is a diagram 200 illustrating a system for file transmission according to an embodiment of the disclosure.

Referring to FIG. 2, a system for file transmission in the disclosure may include a first electronic device 301 and a second electronic device 401. In FIG. 2, descriptions are provided using an example in which the first electronic device 301 is a transmission side electronic device for file transmission, and the second electronic device 401 is a reception side electronic device for file reception, wherein the first electronic device 301 may be a reception side electronic device capable of receiving a file in the same manner as the second electronic device 401, and the second electronic device 401 may be a transmission side electronic device capable of transmitting a file in the same manner as the first electronic device 301.

According to an embodiment, in a state where a file transmission function (e.g., a D2D file transmission function) capable of transmitting a file to an external electronic device located in a short distance is executed, if the second electronic device 401 for file transmission is not found, the first electronic device 301 may generate QR code data including information for changing the first electronic device to a sharing permitted target, and broadcast a packet for a QR code scan request.

According to an embodiment, the first electronic device 301 may broadcast a search request packet (e.g., an advertisement packet) when execution of the file transmission function (e.g., the D2D file transmission function) capable of transmitting a file to an external electronic device located in a short distance is selected.

According to an embodiment, if the first electronic device 301 fails to receive a search response packet in response to broadcasting the search request packet (e.g., the advertisement packet), the first electronic device 301 may generate the QR code data including the information for changing the first electronic device 301 to the sharing permitted target, and control a display of the first electronic device 301 to display the QR code data. If the first electronic device 301 fails to receive the search response packet within a configured time (e.g., 5 seconds to 10 seconds), the QR code may be generated, and the configured time may be configured differently for each electronic device or depending on a current signal strength or interference.

According to an embodiment, the QR code data including the information for changing the first electronic device 301 to the sharing permitted target may include at least one of certificate information received by the first electronic device from a server or a phone number of the first electronic device. The certificate information may include a key combination to ensure uniqueness as information issued for each account for personal information protection. The first electronic device may perform security processing (e.g., hashing or encryption) on the phone number of the first electronic device, and then add the phone number to the QR code data.

According to an embodiment, after generating the QR code data, if the search response packet is received from the second electronic device 401 located in a short distance to the first electronic device 301, the first electronic device 301 may control, based on a search result, the display of the first electronic device 301 to display a search list including information of the second electronic device.

According to an embodiment, if selection of the second electronic device is identified from the search list, the first electronic device 301 may receive connection information for file transmission during authentication with the second electronic device, and based on the connection information, may establish a communication connection to the second electronic device 401 by using a short-range communication technology (e.g., Wi-Fi-direct or Wi-Fi-aware) and then transmit a file to the second electronic device 401.

According to an embodiment, when the packet for the QR code scan request is received from the first electronic device 301, the second electronic device 401 may scan the QR code data of the first electronic device 301, and based on analysis of the scanned QR code data, may provide a UI enabling selection of a sharing option that allows the first electronic device 301 to be configured as a sharing permitted target.

According to an embodiment, in a state where, among sharing options for sharing permitted target configuration, a first item for disabling a sharing permitted target or a second item for configuring only a contact stored in an address book to be a sharing permitted target is configured, if the packet for the QR code scan request is received from the first electronic device 301, the second electronic device 401 may scan the QR code data of the first electronic device 301 and, based on analysis of the scanned QR data, provide a user with the UI enabling selection of the second item for configuring only a contact stored in an address book to be a sharing permitted target, or a third item for configuring all nearby electronic devices to be sharing permitted targets.

According to an embodiment, in a state where the first item for disabling a sharing permitted target has been configured among the sharing options for sharing permitted target configuration, the second electronic device 401 may provide the UI enabling selection of the second item for configuring only a contact stored in an address book to be a sharing permitted target, based on a condition of satisfying at least one condition of a condition that the certificate information included in the QR code data exists in a buddy list of the second electronic device, a condition that the second electronic device has been logged in to a server account when the certificate information included in the QR code data does not exist in the buddy list of the second electronic device, a condition of identifying the user's selection to store the phone number, which is included in the QR code data, in an address book when the certificate information included in the QR code data does not exist in the buddy list of the second electronic device and the second electronic device has been logged in to the server account, or a condition that the phone number included in the QR code data exists in the address book when the certificate information included in the QR code data does not exist in the buddy list of the second electronic device and the second electronic device has not been logged in to the server account.

According to an embodiment, in the state where the first item for disabling a sharing permitted target has been configured among the sharing options for sharing permitted target configuration, the second electronic device 401 may provide the UI enabling selection of the second item for configuring only a contact stored in an address book to be a sharing permitted target, based on a condition of satisfying at least one condition of a condition that the phone number included in the QR code data exists in the address book of the second electronic device, or a condition of identifying the user's selection to store the phone number, which is included in the QR code data, in the address book of the second electronic device when the phone number included in the QR code data does not exist in the address book of the second electronic device.

According to an embodiment, in the state where the first item for disabling a sharing permitted target has been configured among the sharing options for sharing permitted target configuration, the second electronic device 401 may provide the UI enabling selection of the third item for configuring all nearby electronic devices to be sharing permitted targets, upon satisfaction of at least one condition of a condition that the certificate information included in the QR code data does not exist in the buddy list of the second electronic device, the second electronic device has been logged in to the server account, and the user's selection to store the phone number, which is included in the QR code data, in an address book is not identified, or a condition that the certificate information included in the QR code data does not exist in the buddy list of the second electronic device, the second electronic device has not been logged in to the server account, and the phone number included in the QR code data does not exist in the address book.

According to an embodiment, in the state where the first item for disabling a sharing permitted target has been configured among the sharing options for sharing permitted target configuration, the second electronic device 401 may provide the UI enabling selection of the third item for configuring all nearby electronic devices to be sharing permitted targets, upon satisfaction of at least one condition of a condition that the phone number included in the QR code data does not exist in the address book of the second electronic device, or a condition that the user's selection to store the phone number, which is included in the QR code data, in the address book of the second electronic device is not identified when the phone number included in the QR code data does not exist in the address book of the second electronic device.

According to an embodiment, the buddy list includes contacts, which have a certificate by using a specific account, among contacts stored in the address book, and may be expressed as "buddy list$\supseteq$(a$\cap$b)$\cup$(c$\cap$d)". (a) may indicate local contact information (e.g., contacts in the address book) in the user's electronic device (A), (b) may indicate contacts, which have a certificate (unique key combination) by using a specific account, in the local contact information in the user's electronic device (A), (c) may indicate local contact information (e.g., contacts in the address book) in another electronic device (B) of the user, and (d) may indicate contacts, which have a certificate (unique key combination) by using a specific account, in the local contact information in another electronic device (B) of the user.

According to an embodiment, in a state where the second item for configuring only a contact stored in the address book of the second electronic device 401 to be a sharing permitted target is configured, the second electronic device 401 may store the phone number, which is included in the QR code data, in the address book when a condition of identifying the user's selection to store the phone number, which is included in the QR code data, in the address book is satisfied, and may provide the UI enabling selection of the third item for configuring all nearby electronic devices to be sharing permitted targets when the condition of identifying the user's selection to store the phone number, which is included in the QR code data, in the address book cannot be satisfied.

According to an embodiment, based on the user's selection for changing the sharing option via the UI for changing the first electronic device to a sharing permitted target based on analysis of the QR code data, if, among the sharing options for sharing permitted target configuration, the first item for disabling a sharing permitted target is changed to the second item for configuring only a contact stored in an address book to be a sharing permitted target or the third item for configuring all nearby electronic devices to be sharing permitted targets, then the second electronic device 401 may transmit a search response packet to the first electronic device 301.

According to an embodiment, based on the user's selection for changing the sharing option via the UI for changing the first electronic device to a sharing permitted target based on analysis of the QR code data, if, in the second item for configuring only a contact stored in an address book to be a sharing permitted target, the phone number included in the QR code data is stored in the address book, or the second item is changed to the third item for configuring all nearby electronic devices to be sharing permitted targets, then the second electronic device 401 may transmit the search response packet to the first electronic device 301.

According to an embodiment, the second electronic device 401 may transmit connection information for file reception during authentication with the first electronic device 301, establish a communication connection to the first electronic device 301 by using a short-range communication technology (e.g., Wi-Fi-direct or Wi-Fi-aware) based on the connection information, and then receive a file from the first electronic device 301.

According to an embodiment, the second electronic device 401 may store, in memory of the electronic device 401, a buddy list including certificate information corresponding to at least one phone number among phone numbers included in the address book. According to an embodiment, the second electronic device 401 may request, from the server, certificate information for at least one phone number having a server account among the phone numbers included in the address book, receive, from the server, the certificate information corresponding to the at least one phone number having the server account among the phone numbers included in the address book, and update the received certificate information in the buddy list.

Figure 3:
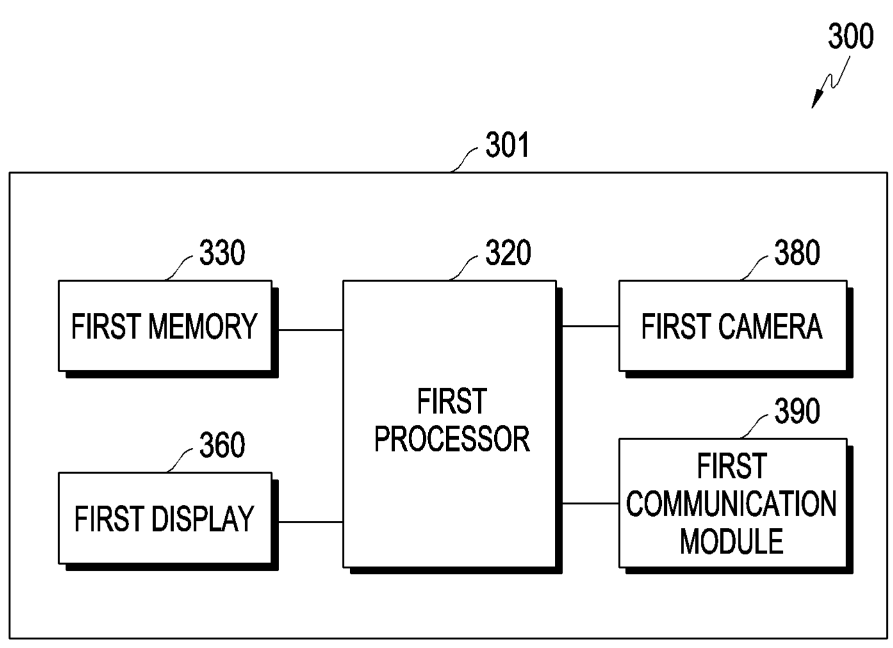
FIG. 3 is a block diagram of a first electronic device according to an embodiment of the disclosure.

FIG. 3 is a block diagram 300 of a first electronic device according to an embodiment of the disclosure.

Referring to FIG. 3, according to an embodiment, the electronic device 301 may include a first processor 320, first memory 330, a first display 360, a first camera 380, and a first communication module 390 (e.g., communication circuitry).

At least some of the elements of the electronic device 301 illustrated in FIG. 3 may be identical or similar to the elements of the electronic device 101 of FIG. 1 and/or the first electronic device 301 illustrated in FIG. 2, and duplicate descriptions, hereinafter, will be omitted.

Figure 4:
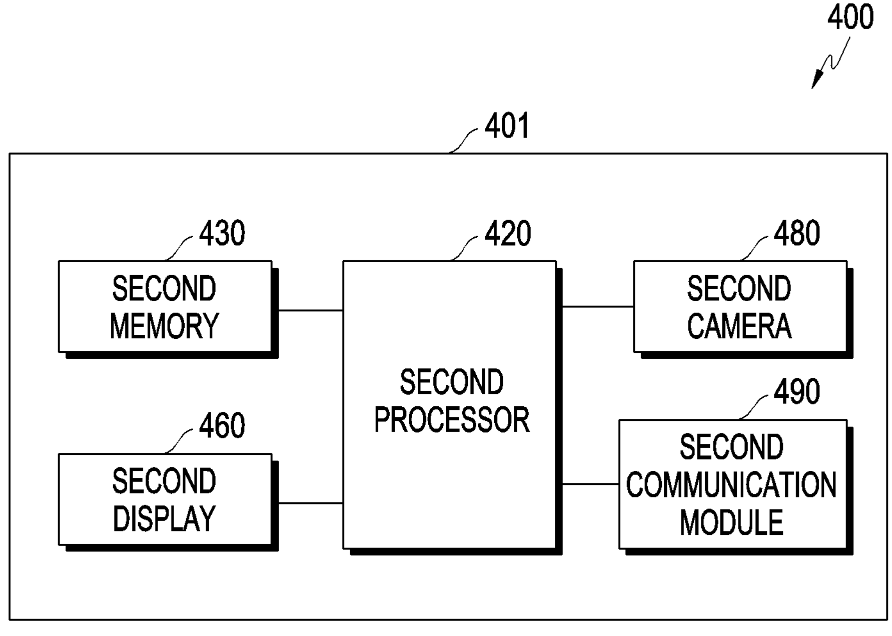
FIG. 4 is a block diagram of a second electronic device according to an embodiment of the disclosure.

In FIG. 3, the elements of the transmission side electronic device 301 for file transmission are described as an example, but, when the electronic device 301 is a reception side electronic device, the elements of the electronic device of FIG. 3 may perform the same functions as the elements of the electronic device of FIG. 4.

According to an embodiment, the first processor 320 may be implemented substantially identically or similarly to the processor 120 of FIG. 1.

According to an embodiment, the first processor 320 may broadcast a search request packet (e.g., an advertisement packet) to search for an external electronic device for file transmission, and if reception of a search response packet from the external electronic device (e.g., the second electronic device 401 of FIG. 2) fails, the first processor 320 may generate QR code data including information for changing the electronic device 301 to a sharing permitted target, and provide the QR code data to the external electronic device.

According to an embodiment, when execution of a file transmission function (e.g., a D2D file transmission function) capable of transmitting a file to the external electronic device (e.g., the second electronic device 401 of FIG. 2) located in a short distance is selected, the first electronic device 301 may broadcast the search request packet (e.g., the advertisement packet) at low power by using a Bluetooth low energy (BLE) communication module included in the first communication module 390.

According to an embodiment, if a search response packet cannot be received from the external electronic device (e.g., the second electronic device 401 of FIG. 2) in response to the search request packet which has been broadcast via the first communication module 390, the first processor 320 may generate QR code data including information for changing the electronic device 301 to a sharing permitted target, broadcast a packet for a QR code scan request via the first communication module 390, and control the first display 360 to display the generated QR code data.

According to an embodiment, the QR code data including the information for changing the first electronic device 301 to the sharing permitted target may include at least one of certificate information of the electronic device, which is received from a server by the electronic device 301, or a phone number of the electronic device.

According to an embodiment, after generating the QR code data, if a search response packet is received from the external electronic device (e.g., the second electronic device 401 of FIG. 2) located in a short distance from the electronic device 301, the first processor 320 may update, based on a search result, a search list including information of the external electronic device and may control the first display 360 to display the updated search list.

According to an embodiment, if selection of the external electronic device (e.g., the second electronic device 401 of FIG. 2) is identified from the search list, the first processor 320 may receive connection information for file transmission during authentication with the external electronic device, and based on the connection information, may establish a communication connection to the external electronic device by using a short-range communication technology (e.g., Wi-Fi-direct or Wi-Fi-aware) and then transmit a file selected by a user to the external electronic device.

According to an embodiment, the first memory 330 may be implemented substantially identically or similarly to the memory 130 of FIG. 1.

According to an embodiment, the first memory 330 may store an address book including at least one phone number, and store a buddy list including certificate information corresponding to at least one phone number among phone numbers included in the address book.

According to an embodiment, the first display 360 may be implemented substantially identically or similarly to the display module 160 of FIG. 1.

According to an embodiment, on the first display 360, according to execution of the file transmission function (e.g., the D2D file transmission function), the search list including information of the external electronic device (e.g., the second electronic device 401 of FIG. 2) having transmitted the search response packet may be displayed based on the search result of the external electronic device located in a short distance.

According to an embodiment, the first camera 380 may be implemented substantially identically or similarly to the camera module 180 of FIG. 1.

According to an embodiment, the first communication module 390 may be implemented substantially identically or similarly to the communication module 190 of FIG. 1, and may include multiple communication circuits using different communication technologies.

According to an embodiment, the first communication module 390 may include at least one of a wireless LAN module (not illustrated) and a short-range communication module (not illustrated), and may include, as the short-range communication module (not illustrated), an ultra-wide-band (UWB) communication module, a Wi-Fi communication module, an NFC communication module, a Bluetooth legacy communication module, and/or a BLE communication module.

According to an embodiment, the first communication module 390 may broadcast the search request packet according to execution of the file transmission function (e.g., the D2D file transmission function), and receive the search response packet from the external electronic device (e.g., the second electronic device 401 of FIG. 2) in response to the search request packet.

FIG. 4 is a block diagram 400 of a second electronic device according to an embodiment of the disclosure.

Referring to FIG. 4, according to an embodiment, the electronic device 401 may include a second processor 420, second memory 430, a second display 460, a second camera 480, and a second communication module 490 (e.g., communication circuitry).

At least some of the elements of the electronic device 401 illustrated in FIG. 4 may be identical or similar to the elements of the electronic device 101 of FIG. 1 and/or the second electronic device 401 illustrated in FIG. 2, and duplicate descriptions, hereinafter, will be omitted.

In FIG. 4, the elements of the reception side electronic device 401 for file reception are described as an example, but, when the electronic device 401 is a transmission side electronic device, the elements of the electronic device of FIG. 4 may perform the same functions as the elements of the electronic device of FIG. 3.

According to an embodiment, the second processor 420 may be implemented substantially identically or similarly to the processor 120 of FIG. 1.

According to an embodiment, when a packet for a QR code scan request is received from an external electronic device (e.g., the first electronic device 301 of FIG. 2), the second processor 420 may enable a QR code scan function to scan QR code data of the external electronic device via the second camera 480, and based on analysis of the scanned QR code data, control the second display 460 to provide a UI enabling selection of a sharing option that allows the external electronic device to be configured as a sharing permitted target.

According to an embodiment, the sharing option enabling configuration as a sharing permitted target may include a first item for disabling a sharing permitted target (e.g., a state where all sharing permitted targets are turned off), a second item for configuring only a contact stored in an address book to be a sharing permitted target, and/or a third item for configuring all nearby electronic devices to be sharing permitted targets.

According to an embodiment, in a state where the first item for disabling a sharing permitted target, among the sharing options for sharing permitted target configuration, has been configured for the electronic device 401, if the packet for the QR code scan request is received from the external electronic device (e.g., the first electronic device 301 of FIG. 2), the second processor 420 may scan, using the second camera 480, the QR code data provided via the display (e.g., the first display 360 of FIG. 3) of the external electronic device, and based on analysis of the scanned QR code data, control the second display 460 to display the UI enabling selection of the sharing option for sharing permitted target configuration so that the first item is switched to the second item for configuring only a contact stored in an address book to be a sharing permitted target or the third item for configuring all nearby electronic devices to be sharing permitted targets.

According to an embodiment, in the state where the first item for disabling a sharing permitted target, among the sharing options for sharing permitted target configuration, has been configured for the electronic device 401, if a condition that certificate information included in the QR code data exists in a buddy list stored in the second memory 430 is satisfied based on the analysis of the scanned QR code data, the second processor 420 may control the second display 460 to display the UI enabling selection of the second item for configuring only a contact stored in an address book to be a sharing permitted target.

According to an embodiment, in the state where the first item for disabling a sharing permitted target, among the sharing options for sharing permitted target configuration, has been configured for the electronic device 401, if a condition that the certificate information included in the QR code data does not exist in the buddy list stored in the second memory 430, the electronic device 401 has been logged in to a server account, and a user's selection to store a phone number, which is included in the QR code data, in an address book is identified is satisfied, the second processor 420 may, based on the analysis of the scanned QR code data, store the phone number, which is included in the QR code data, in the address book and download certificate information of account information corresponding to the phone number included in the QR code data from the server, so as to update the buddy list. The second processor 420 may control the second display 460 to display the UI enabling selection of the second item for configuring only a contact stored in an address book to be a sharing permitted target.

According to an embodiment, in the state where the first item for disabling a sharing permitted target, among the sharing options for sharing permitted target configuration, has been configured for the electronic device 401, if a condition that the certificate information included in the QR code data does not exist in the buddy list stored in the second memory 430, the electronic device 401 has not been logged in to the server account, and the phone number included in the QR code data exists in the address book is satisfied, the second processor 420 may, based on the analysis of the scanned QR code data, display a UI that induces login to the server account, and when the electronic device 401 is logged in to the server account, download authentication information of account information corresponding to the phone number from the server so as to update the buddy list. The second processor 420 may control the second display 460 to display the UI enabling selection of the second item for configuring only a contact stored in an address book to be a sharing permitted target.

According to an embodiment, in the state where the first item for disabling a sharing permitted target, among the sharing options for sharing permitted target configuration, has been configured for the electronic device 401, if a condition that the certificate information included in the QR code data does not exist in the buddy list stored in the second memory 430, the electronic device 401 has been logged in to the server account, and the user's selection to store the phone number, which is included in the QR code data, in the address book is not identified is satisfied, the second processor 420 may control, based on the analysis of the scanned QR code data, the second display 460 to display the UI so as to enable selection of the third item for configuring all nearby electronic devices to be sharing permitted targets.

According to an embodiment, in the state where the first item for disabling a sharing permitted target, among the sharing options for sharing permitted target configuration, has been configured for the electronic device 401, if a condition that the certificate information included in the QR code data does not exist in the buddy list stored in the second memory 430, the electronic device 401 has not been logged in to the server account, and the phone number included in the QR code data does not exist in the address book is satisfied, the second processor 420 may control, based on the analysis of the scanned QR code data, the second display 460 to display the UI so as to enable selection of the third item for configuring all nearby electronic devices to be sharing permitted targets.

According to an embodiment, in a state where the second item for configuring only a contact stored in an address book to be a sharing permitted target, among the sharing options for sharing permitted target configuration, has been configured for the electronic device 401, if a condition of identifying the user's selection to store the phone number, which is included in the QR code data, in the address book is satisfied, the second processor 420 may store the phone number, which is included in the QR code data, in the address book based on the analysis of the scanned QR code data.

According to an embodiment, in the state where the second item for configuring only a contact stored in an address book to be a sharing permitted target, among the sharing options for sharing permitted target configuration, has been configured for the electronic device 401, if a condition of being unable to identify the user's selection to store the phone number, which is included in the QR code data, in the address book is satisfied, the second processor 420 may control, based on the analysis of the scanned QR code data, the second display 460 to display the UI so as to enable selection of the third item for configuring all nearby electronic devices to be sharing permitted targets.

According to an embodiment, the second processor 420 may store, in the second memory 430 of the electronic device 401, the buddy list including certificate information corresponding to at least one phone number among phone numbers included in the address book.

According to an embodiment, the second processor 420 may request, from the server, certificate information for at least one phone number having a server account among the phone numbers included in the address book, receive, as the certificate information from the server, account information for the at least one phone number having a server account among the phone numbers included in the address book, and update the received certificate information in the buddy list.

According to an embodiment, the second processor 420 may request the server to transmit the certificate information of the electronic device 401 to external electronic devices corresponding to the phone numbers included in the address book.

According to an embodiment, the certificate information included in the buddy list may be account information of the server that manages the electronic device, or may be account information of a 3rd party (e.g., an application) capable of issuing a certificate.

According to an embodiment, based on the analysis of the scanned QR code data, after a change to the second item for configuring only a contact stored in an address book to be a sharing permitted target or to the third item for configuring all nearby electronic devices to be sharing permitted targets, when file reception from the external electronic device has been completed or a determined time (e.g., a time at which the item change has been made based on the analysis of the scanned QR code data) is identified, the second processor 420 may change the sharing option, which enables configuration as a sharing permitted target, to a previously configured item (e.g., the first item for disabling a sharing permitted target or the second item for configuring only a contact stored in an address book to be a sharing permitted target) or to an item configured by default (e.g., the first item for disabling a sharing permitted target).

According to an embodiment, after the file reception from the external electronic device has been completed, and the sharing option, which enables configuration as a sharing permitted target, has been changed to the previously configured item (e.g., the first item for disabling a sharing permitted target or the second item for configuring only a contact stored in an address book to be a sharing permitted target) or to the item configured by default (e.g., the first item for disabling a sharing permitted target), if a determined location (e.g., a location at which the item change has been made based on the analysis of the scanned QR code data) is identified, configuration to the changed item (e.g., the second item or the third item) may be performed based on the analysis of the scanned QR code data.

According to an embodiment, in a state where the first item for disabling a sharing permitted target is configured, the second processor 420 may change the sharing option which enables configuration as a sharing permitted target, so as to configure the second item for configuring only a contact stored in an address book to be a sharing permitted target or the third item for configuring all nearby electronic devices to be sharing permitted targets, according to whether the user's selection to store, in the buddy list, the certificate information and/or phone number included in the scanned QR code data is identified. For example, the second processor 420 may configure the second item if the user's selection to store, in the buddy list, the certificate information and/or phone number included in the scanned QR code data is identified, and may configure the third item if the user's selection to store, in the buddy list, the certificate information and/or phone number included in the scanned QR code data cannot be identified. According to an embodiment, the second memory 430 may be implemented substantially identically or similarly to the memory 130 of FIG. 1.

According to an embodiment, the second memory 430 may store an address book including at least one phone number, and store a buddy list including certificate information corresponding to at least one phone number among phone numbers included in the address book.

According to an embodiment, the second display 460 may be implemented substantially identically or similarly to the display module 160 of FIG. 1.

According to an embodiment, on the second display 460, the UI including the sharing option (e.g., the first item, the second item, and/or the third item) which enables configuration to a sharing permitted target may be displayed.

According to an embodiment, the second camera 480 may be implemented substantially identically or similarly to the camera module 180 of FIG. 1.

According to an embodiment, the QR code data displayed on the display (e.g., the first display 360 of FIG. 3) of the external electronic device (e.g., the first electronic device 301 of FIG. 2) may be scanned via the second camera 480.

According to an embodiment, the second communication module 490 may be implemented substantially identically or similarly to the communication module 190 of FIG. 1, and may include multiple communication circuits using different communication technologies.

According to an embodiment, the second communication module 490 may include at least one of a wireless LAN module (not illustrated) and a short-range communication module (not illustrated), and may include, as the short-range communication module (not illustrated), an ultra-wide-band (UWB) communication module, a Wi-Fi communication module, an NFC communication module, a Bluetooth legacy communication module, and/or a BLE communication module.

According to an embodiment, via the second communication module 490, the packet for the QR code scan request may be received from the external electronic device (e.g., the first electronic device 301), and the search response packet may be transmitted to the external electronic device.

Figures 5A, 5B:
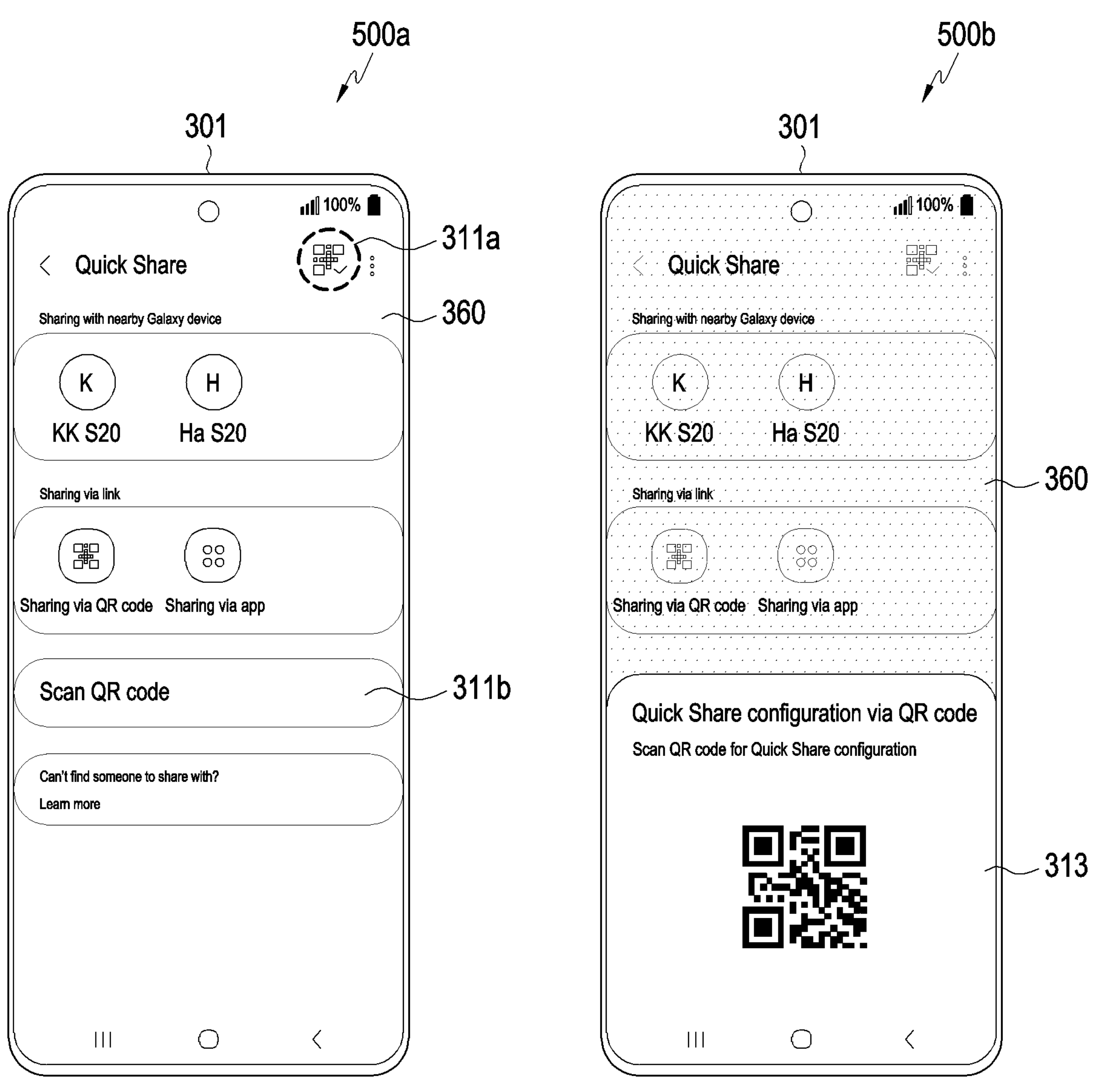
FIGS. 5A, 5B, and 5C are diagrams for illustrating an operation of configuring a sharing option for file transmission according to various embodiments of the disclosure.
Figure 5C:
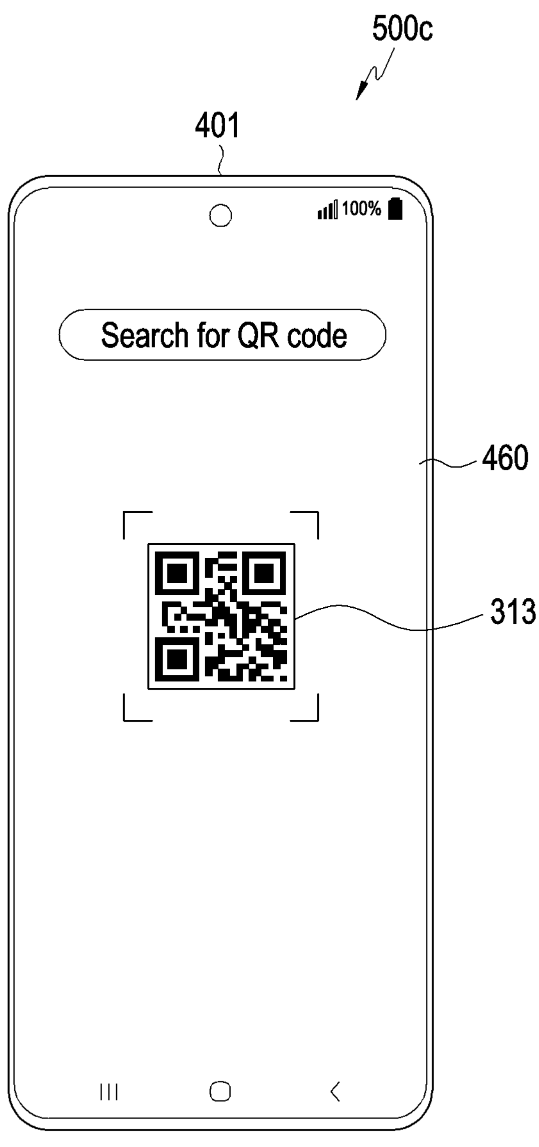

FIGS. 5A to 5C are diagrams for illustrating an operation of configuring a sharing option for file transmission according to various embodiments of the disclosure.

Referring to FIG. 5A, in diagram 500*a,* in a state where a file transmission function (e.g., a D2D file transmission function) capable of transmitting a file to an external electronic device located in a short distance is executed, if the second electronic device 401 (e.g., the second electronic device 401 of FIG. 2 and the electronic device 401 of FIG. 4) for file transmission is not found, the first electronic device 301 (the first electronic device 301 of FIG. 2 and the electronic device 301 of FIG. 3) may generate QR code data including certificate information and a phone number of the first electronic device, broadcast a packet for a QR code scan request, display an icon 311*a* capable of providing the generated QR code at the top of the display of the first electronic device 301, and display a text menu 311*b* capable of providing the generated QR code at the bottom of the display of the first electronic device 301.

Referring to FIG. 5B, in diagram 500*b,* based on a selection of the icon 311*a* or the text menu 311*b,* the first electronic device 301 may control the display 360 (e.g., the first display 360 of FIG. 3) of the first electronic device to display the QR code data 313.

Referring to FIG. 5C, in diagram 500*c,* when the packet for the QR code scan request broadcast by the first electronic device 301 is received, the second electronic device 401 may execute a QR code scan function and scan the QR code data 313 displayed on the display 360 of the first electronic device 301 via a camera (e.g., the second camera 480 of FIG. 4) of the second electronic device 401. The second electronic device 401 may, based on analysis of the scanned QR code data 313, provide a user with a UI enabling selection of a sharing option that allows the first electronic device 301 to be configured as a sharing permitted target.

FIGS. 6A to 6D are diagrams for illustrating an operation of configuring a sharing option for file transmission according to various embodiments of the disclosure.

Figures 6A, 6B:
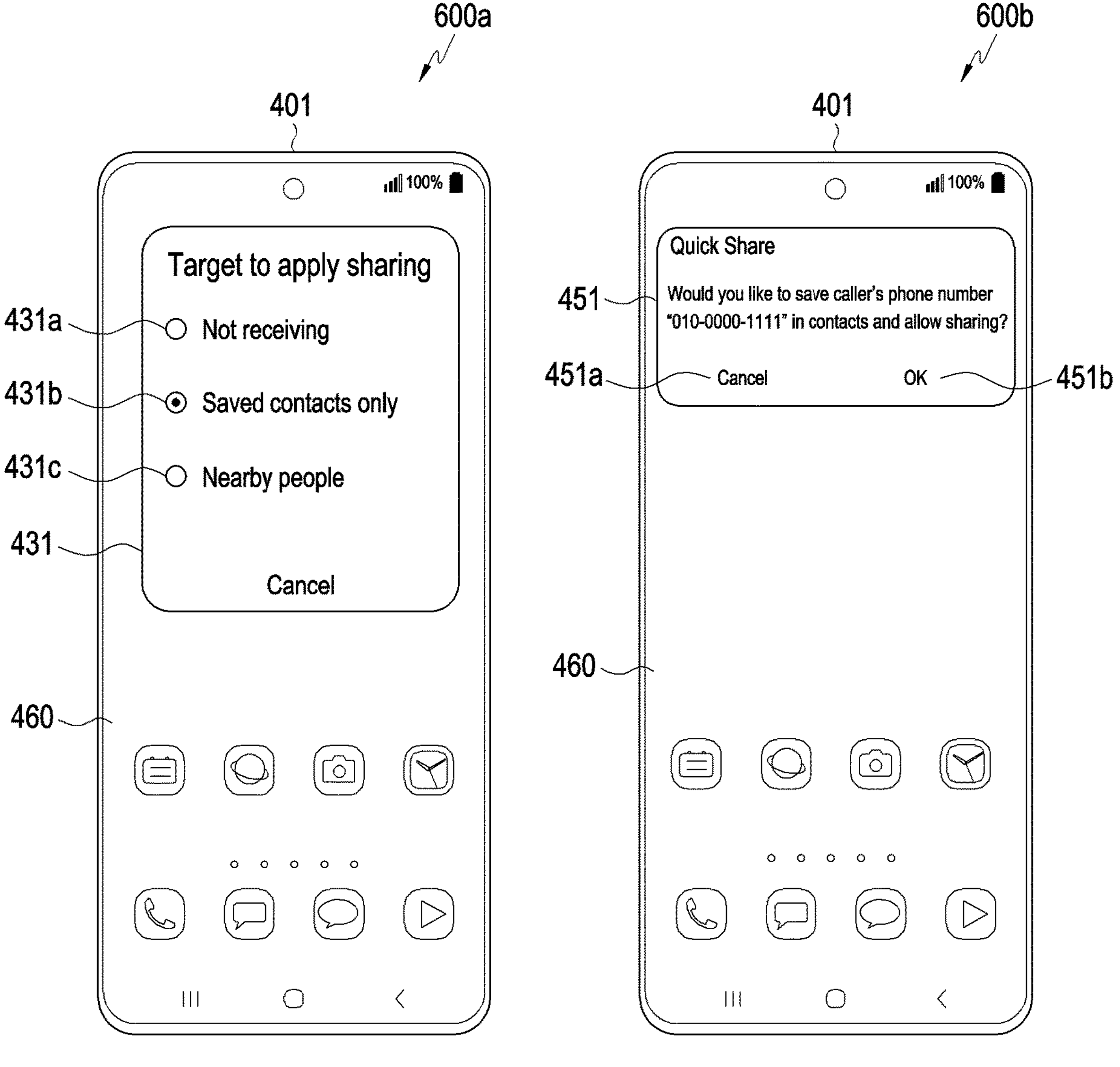
FIGS. 6A, 6B, 6C, and 6D are diagrams for illustrating an operation of configuring a sharing option for file transmission according to various embodiments of the disclosure.

Referring to FIG. 6A, in diagram 600*a,* in a state where a second item 431*b* for configuring only a contact stored in an address book to be a sharing permitted target is configured, the second electronic device 401 (the second electronic device 401 of FIG. 2 and the electronic device 401 of FIG. 4) may control, based on analysis of the QR code data generated by the first electronic device 301 (the first electronic device 301 of FIG. 2 and the electronic device 301 of FIG. 3), the display 460 (e.g., the second display 460 of FIG. 4) of the second electronic device 401 to display a UI 451 that induces storing of the phone number, which is included in the QR code data, in an address book of the second electronic device 401.

While displaying the state in which the second item 431*b* is configured as shown in FIG. 6A, the second electronic device 401 may separately display an OK button (not illustrated), based on the analysis of the QR code data generated by the first electronic device 301, and if selection of the OK button is identified, control the display 460 to display the UI 451 that induces storing of the phone number, which is included in the QR code data, in the address book of the second electronic device 401.

While displaying the state in which the second item 431*b* is configured as shown in FIG. 6A, the second electronic device 401 may induce, based on the analysis of the QR code data generated by the first electronic device 301, additional selection of the second item 431*b* while providing a visual effect (e.g., a color change or blinking effect) in an area where the second item 431*b* is displayed. When additional selection of the second item 431*b* is identified, the second electronic device 401 may control the display 460 to display the UI 451 that induces storing of the phone number, which is included in the QR code data, in the address book of the second electronic device 401.

While displaying the state in which the second item 431*b* is configured as shown in FIG. 6A, the second electronic device 401 may control, based on the analysis of the QR code data generated by the first electronic device 301, the display 460 to display the UI 451 that induces storing of the phone number, which is included in the QR code data, in the address book of the second electronic device 401, without an additional operation.

Referring to FIG. 6B, in diagram 600*b,* while controlling the display 460 of the second electronic device and displaying the UI 451 that induces storing of the phone number, which is included in the QR code data, in the address book of the second electronic device 401, if, as a user selects "OK" 451*b*, a condition of identifying the user's selection to store the phone number, which is included in the QR code data, in the address book is satisfied, the second electronic device 401 may transmit a search response packet to the first electronic device 301.

Figures 6C, 6D:
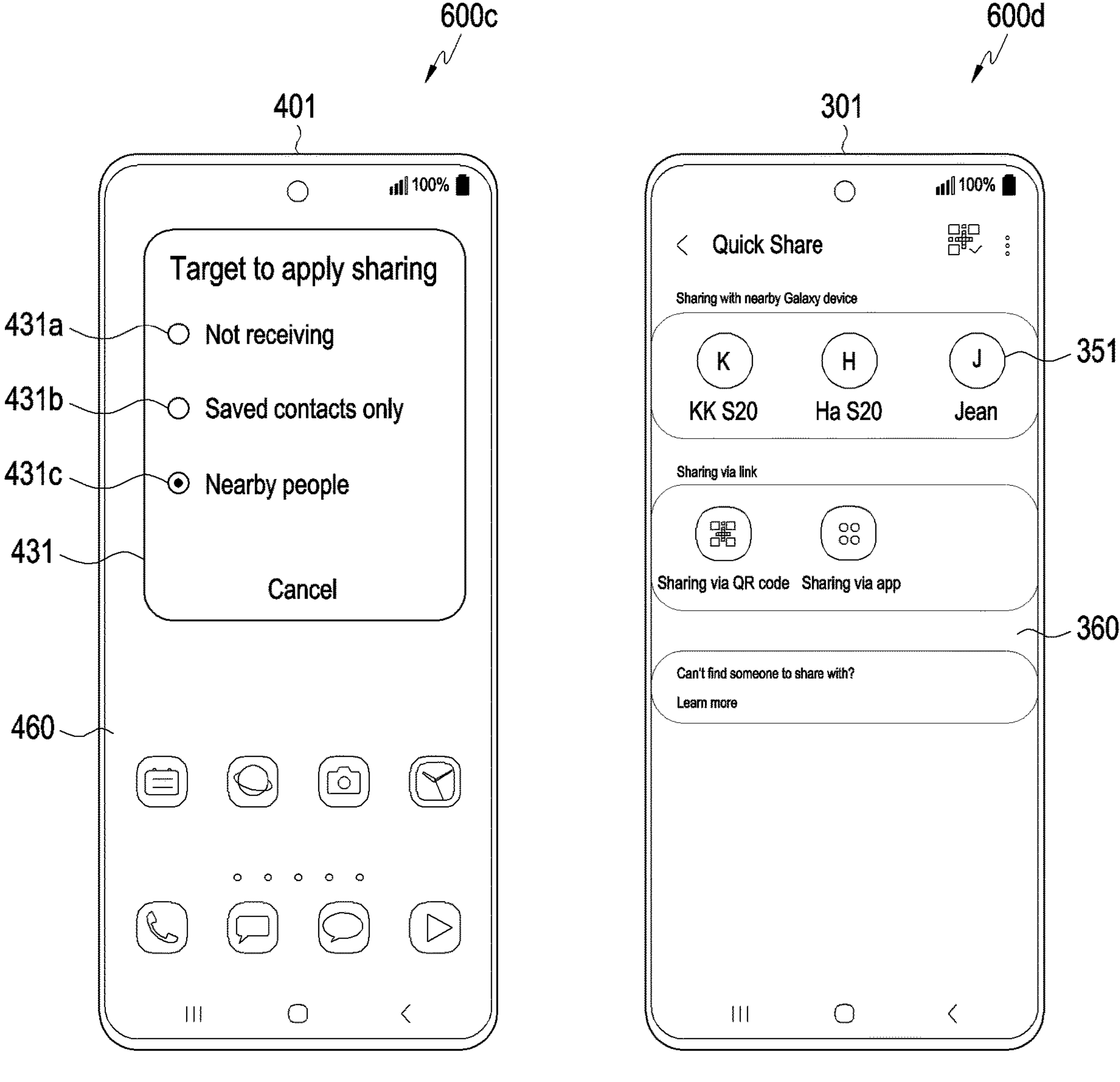

Referring to FIG. 6C, in diagram 600*c*, while controlling the display 460 of the second electronic device and displaying the UI 451 that induces storing of the phone number, which is included in the QR code data, in the address book of the second electronic device 401, if, as the user selects "Cancel" 451*a*, a condition of being unable to identify the user's selection to store the phone number, which is included in the QR code data, in the address book is satisfied, the second electronic device 401 may control the display 460 of the second electronic device 401 and provide a UI 431 enabling selection of a third item 431*c* for configuring all nearby electronic devices to be sharing permitted targets from among sharing options for sharing permitted target configuration.

Referring to FIG. 6D, in diagram 600*d*, in a state where the file transmission function (e.g., the D2D file transmission function) capable of transmitting a file to an external electronic device located in a short distance is executed, when the second electronic device 401 is not found before generation of QR code data, but a search response packet is received from the second electronic device 401 after generation of the QR code data, the first electronic device 301 may control the display 360 of the first electronic device 301 to display a search list including information 351 of the second electronic device.

Figures 7A, 7B:
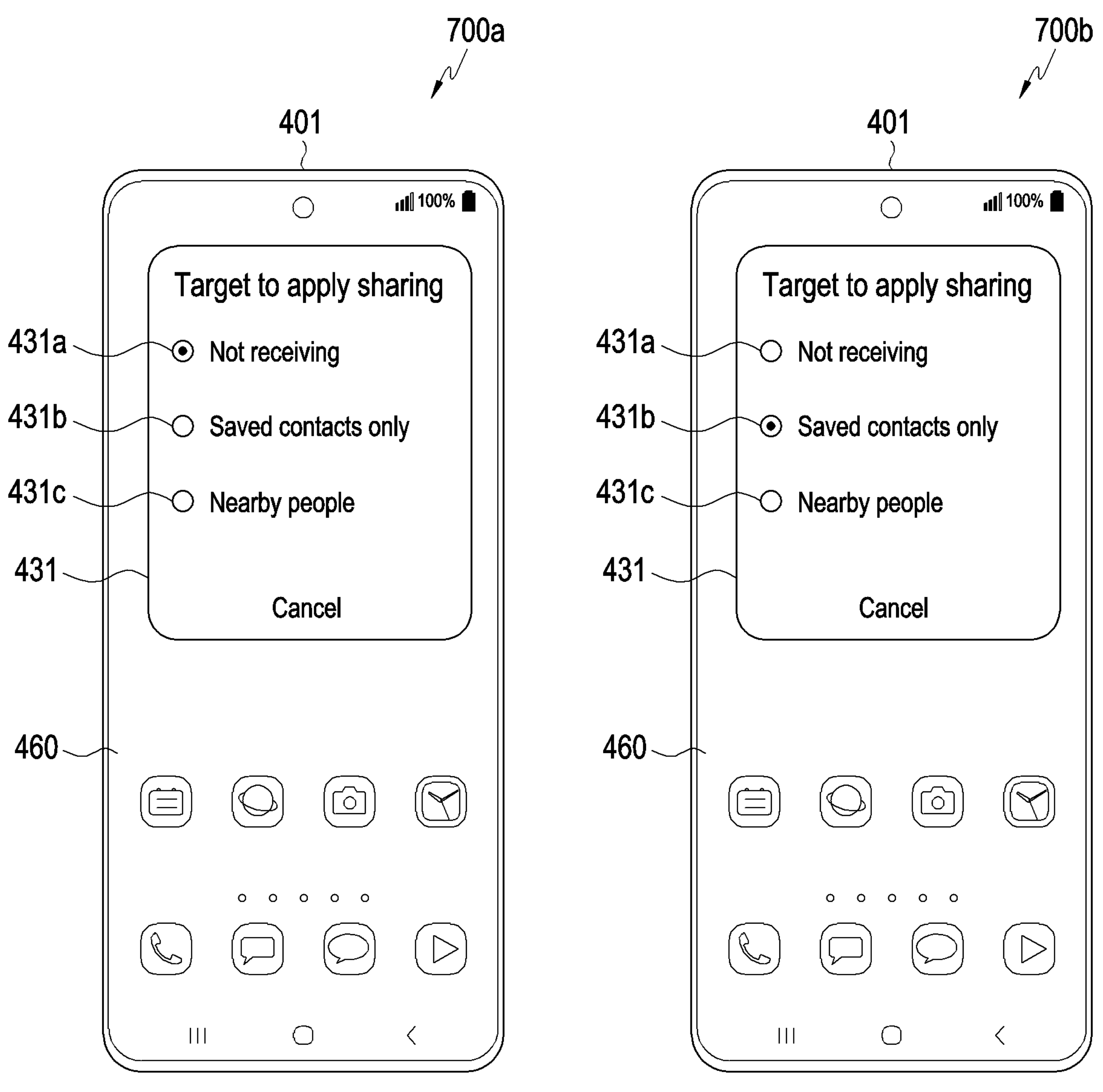
FIGS. 7A, 7B, and 7C are diagrams for illustrating an operation of configuring a sharing option for file transmission according to various embodiments of the disclosure.
Figure 7C:
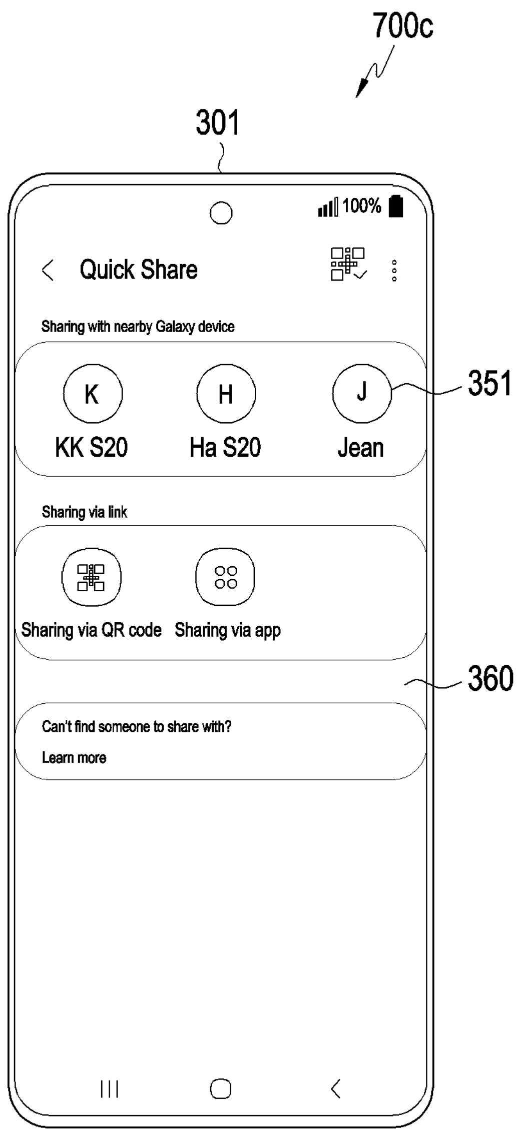

FIGS. 7A to 7C are diagrams for illustrating an operation of configuring a sharing option for file transmission according to various embodiments of the disclosure.

Referring to FIG. 7A, in diagram 700*a*, in a state where a first item 431*a* for disabling a sharing permitted target has been configured among the sharing options 431 for sharing permitted target configuration, the second electronic device 401 (the second electronic device 401 of FIG. 2 and the electronic device 401 of FIG. 4) may determine, based on analysis of the QR code data generated by the first electronic device 301 (the first electronic device 301 of FIG. 2 and the electronic device 301 of FIG. 3), whether a condition that certificate information of the QR code data exists in a buddy list of the second electronic device is satisfied.

Referring to FIG. 7B, in diagram 700*b*, if the condition that the certificate information of the QR code data exists in the buddy list of the second electronic device is satisfied, the second electronic device 401 may control the display 460 (e.g., the second display 460 of FIG. 4) of the second electronic device 401 to provide the UI 431 enabling selection of the second item 431*b* for configuring only a contact stored in an address book to be a sharing permitted target from among the sharing options for sharing permitted target configuration. When the user's selection for the second item 431*b* among the sharing options is identified, the second electronic device 401 may transmit a search response packet to the first electronic device 301.

Referring to FIG. 7C, in diagram 700*c*, in a state where the file transmission function (e.g., the D2D file transmission function) capable of transmitting a file to an external electronic device located in a short distance is executed, when the second electronic device 401 is not found before generation of QR code data, but a search response packet is received from the second electronic device 401 after generation of the QR code data, the first electronic device 301 may control the display 360 of the first electronic device 301 to display a search list including the information 351 of the second electronic device.

FIGS. 8A to 8E are diagrams for illustrating an operation of configuring a sharing option for file transmission according to various embodiments of the disclosure.

Figures 8A, 8B:
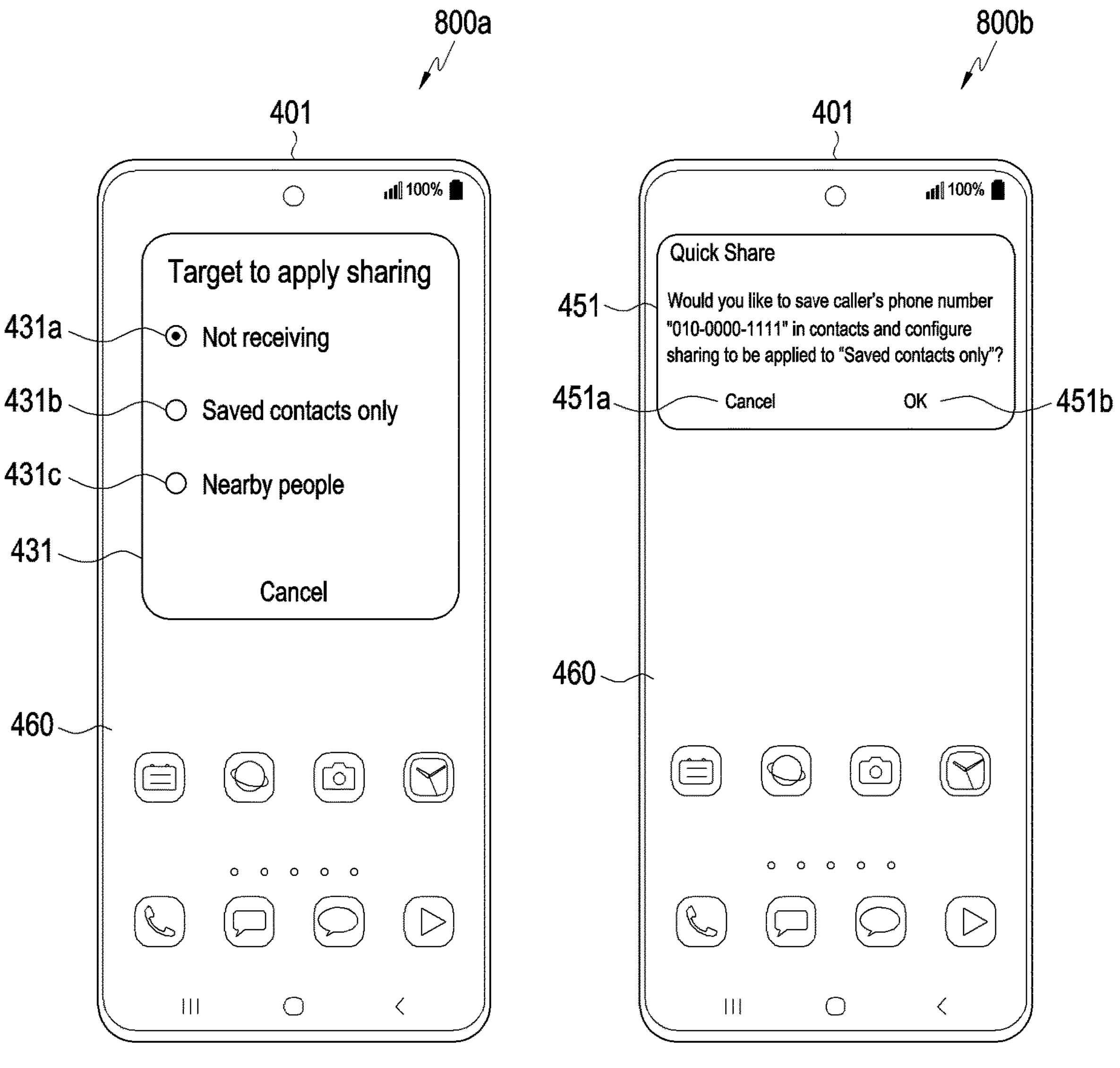
FIGS. 8A, 8B, 8C, 8D, and 8E are diagrams for illustrating an operation of configuring a sharing option for file transmission according to various embodiments of the disclosure.

Referring to FIG. 8A, in diagram 800*a*, in a state where the first item 431*a* for disabling a sharing permitted target has been configured among the sharing options 431 for sharing permitted target configuration, the second electronic device 401 (the second electronic device 401 of FIG. 2 and the electronic device 401 of FIG. 4) may determine, based on analysis of the QR code data generated by the first electronic device 301 (the first electronic device 301 of FIG. 2 and the electronic device 301 of FIG. 3), whether a condition that, if the certificate information of the QR code data does not exist in the buddy list of the second electronic device, the second electronic device is logged in to a server account is satisfied.

Referring to FIG. 8B, in diagram 800*b*, if the condition that the certificate information of the QR code data does not exist in the buddy list of the second electronic device, and the second electronic device has been logged in to the server account is satisfied, the second electronic device 401 may control the display 460 of the second electronic device to display the UI 451 that induces storing of the phone number, which is included in the QR code data, in the address book of the second electronic device 401.

Figures 8C, 8D:
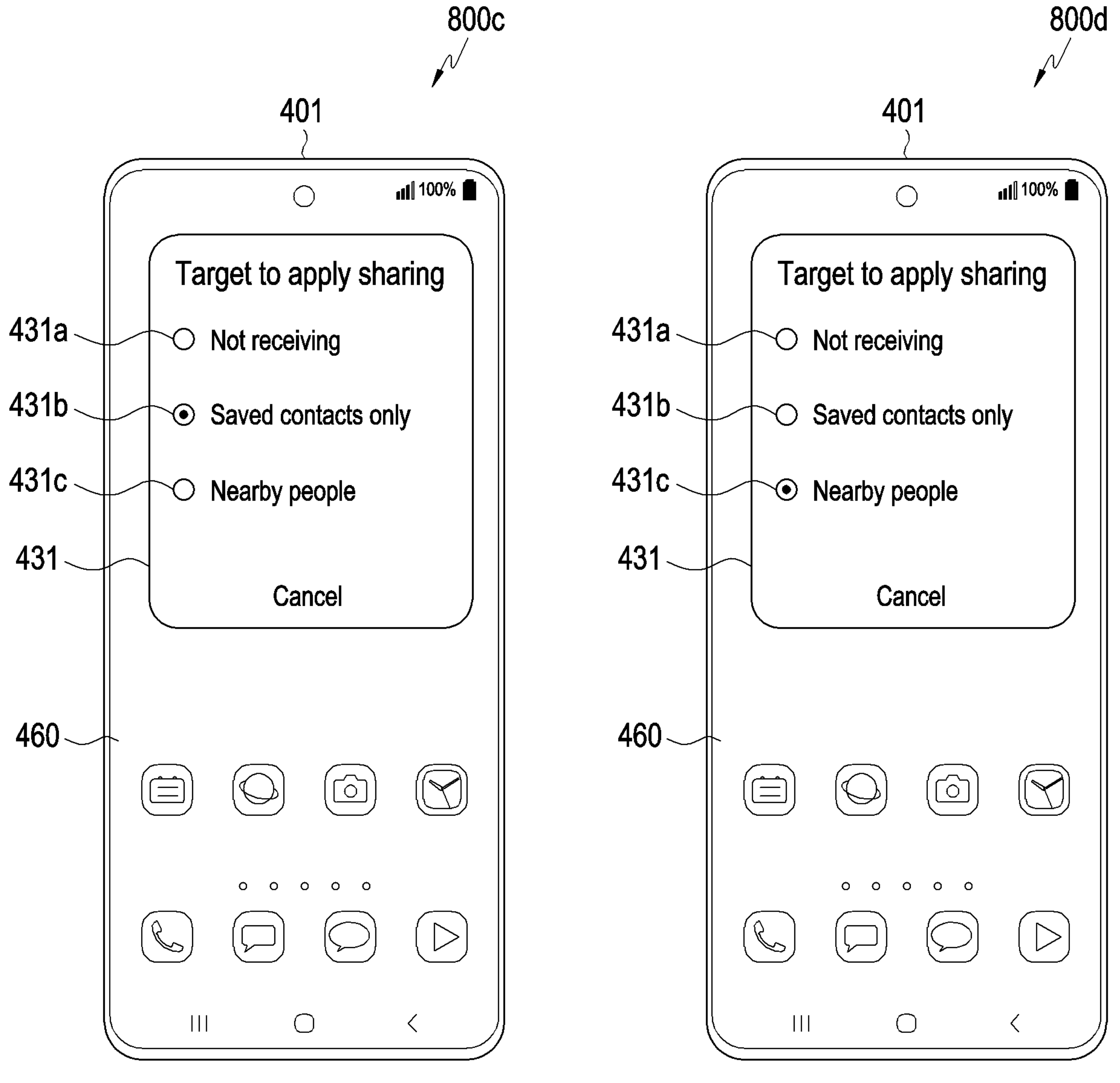

Referring to FIG. 8C, in diagram 800*c*, while controlling the display 460 of the second electronic device and displaying the UI 451 that induces storing of the phone number, which is included in the QR code data, in the address book of the second electronic device 401, the condition of identifying the user's selection to store the phone number, which is included in the QR code data, in the address book is satisfied as the user selects "OK" 451*b*, so that the second electronic device 401 may provide the UI 431 enabling selection of the second item 431*b* for configuring only a contact stored in an address book to be a sharing permitted target from among the sharing options for sharing permitted target configuration. Based on the user's selection for the second item 431*b* among the sharing options, the second electronic device 401 may transmit a search response packet to the first electronic device 301.

Referring to FIG. 8D, in diagram 800*d*, while controlling the display 460 of the second electronic device and displaying the UI 451 that induces storing of the phone number, which is included in the QR code data, in the address book of the second electronic device 401, the condition of being unable to identify the user's selection to store the phone number, which is included in the QR code data, in the address book is satisfied as the user selects "Cancel" 451*a*, so that the second electronic device 401 may provide the UI 431 enabling selection of the third item 431*c* for configuring all nearby electronic devices to be sharing permitted targets from among the sharing options for sharing permitted target configuration. Based on the user's selection for the third item 431*c* among the sharing options, the second electronic device 401 may transmit a search response packet to the first electronic device 301.

Figure 8E:
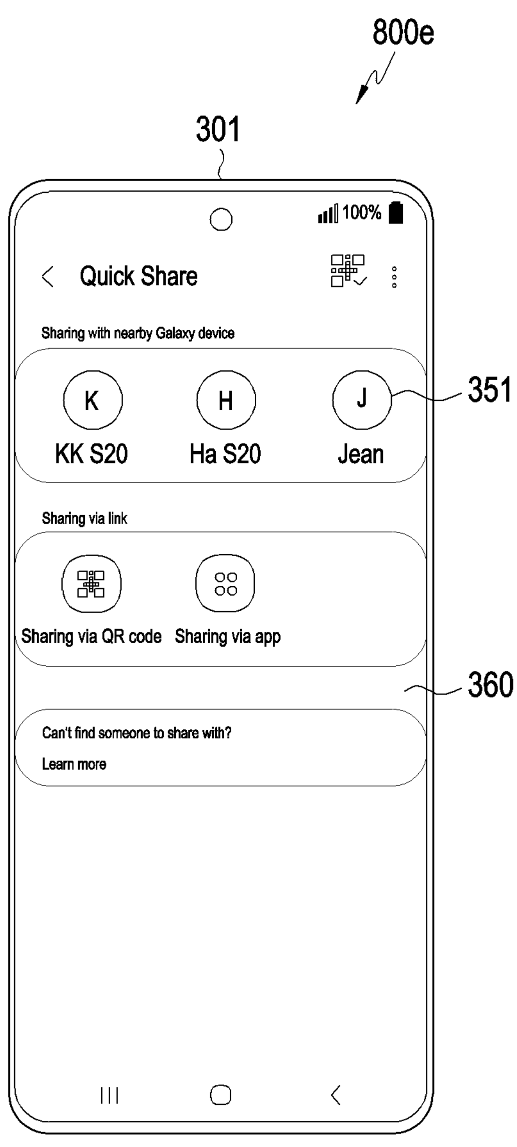

Referring to FIG. 8E, in diagram 800*e*, in a state where the file transmission function (e.g., the D2D file transmission function) capable of transmitting a file to an external electronic device located in a short distance is executed, when the second electronic device 401 is not found before generation of QR code data, but a search response packet is received from the second electronic device 401 after generation of the QR code data, the first electronic device 301 may control the display 360 of the first electronic device 301 to display a search list including the information 351 of the second electronic device.

FIGS. 9A to 9F are diagrams for illustrating an operation of configuring a sharing option for file transmission according to various embodiments of the disclosure.

Figures 9A, 9B:
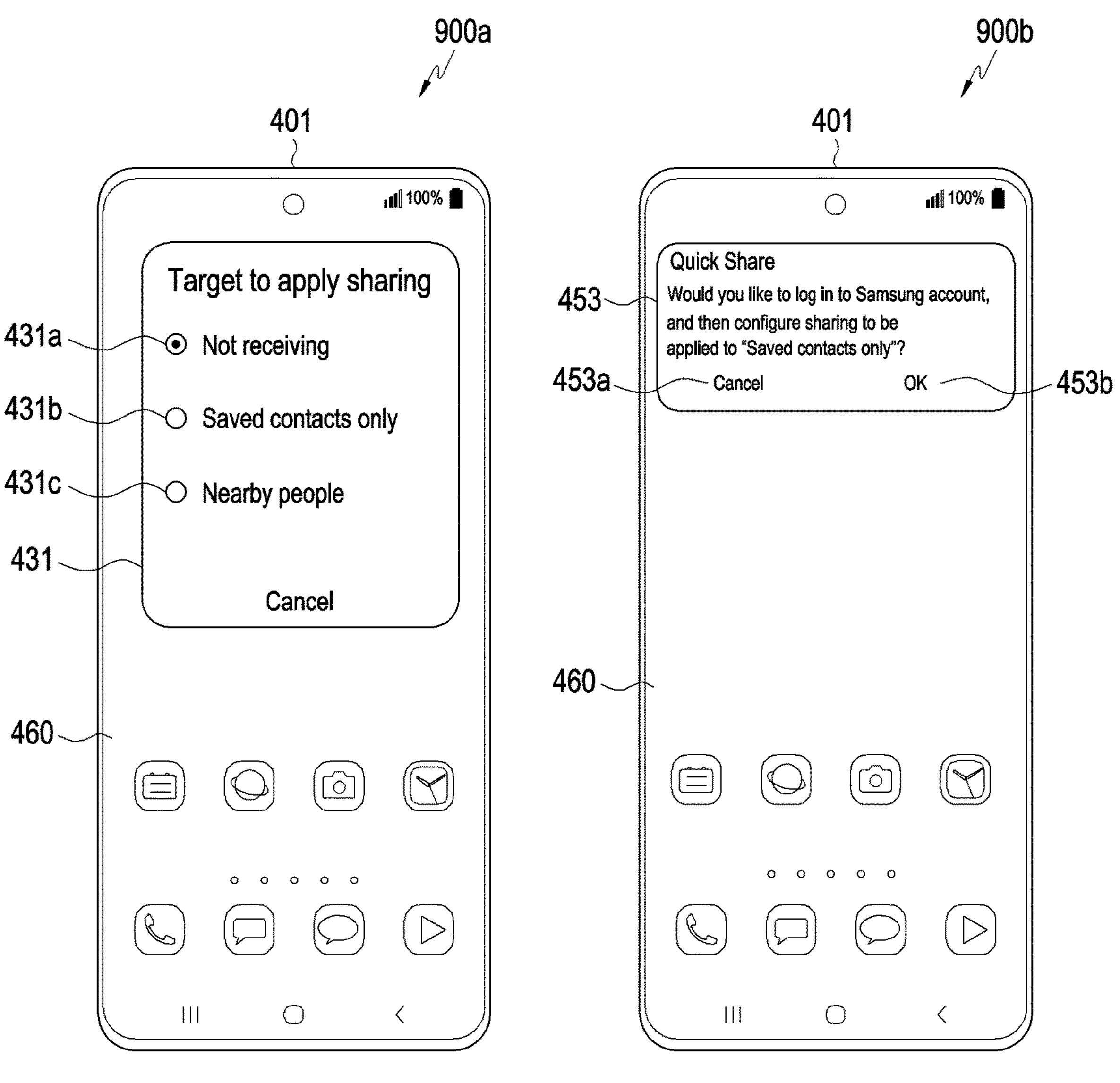
FIGS. 9A, 9B, 9C, 9D, 9E, and 9F are diagrams for illustrating an operation of configuring a sharing option for file transmission according to various embodiments of the disclosure.

Referring to FIG. 9A, in diagram 900*a*, in the state where the first item 431*a* for disabling a sharing permitted target has been configured among the sharing options 431 for sharing permitted target configuration, the second electronic device 401 (the second electronic device 401 of FIG. 2 and the electronic device 401 of FIG. 4) may determine, based on analysis of the QR code data generated by the first electronic device 301 (the first electronic device 301 of FIG. 2 and the electronic device 301 of FIG. 3), whether a condition that the certificate information of the QR code data does not exist in the buddy list of the second electronic device, the second electronic device has not been logged in to the server account, and the phone number included in the QR code data exists in the address book is satisfied.

Referring to FIG. 9B, in diagram 900*b*, if the condition that the certificate information of the QR code data does not exist in the buddy list of the second electronic device, the second electronic device 401 has not been logged in to the server account, and the phone number included in the QR code data exists in the address book is satisfied, the second electronic device 401 may control the display 460 of the second electronic device to display a UI 453 that induces logging into the server account.

Figures 9C, 9D:
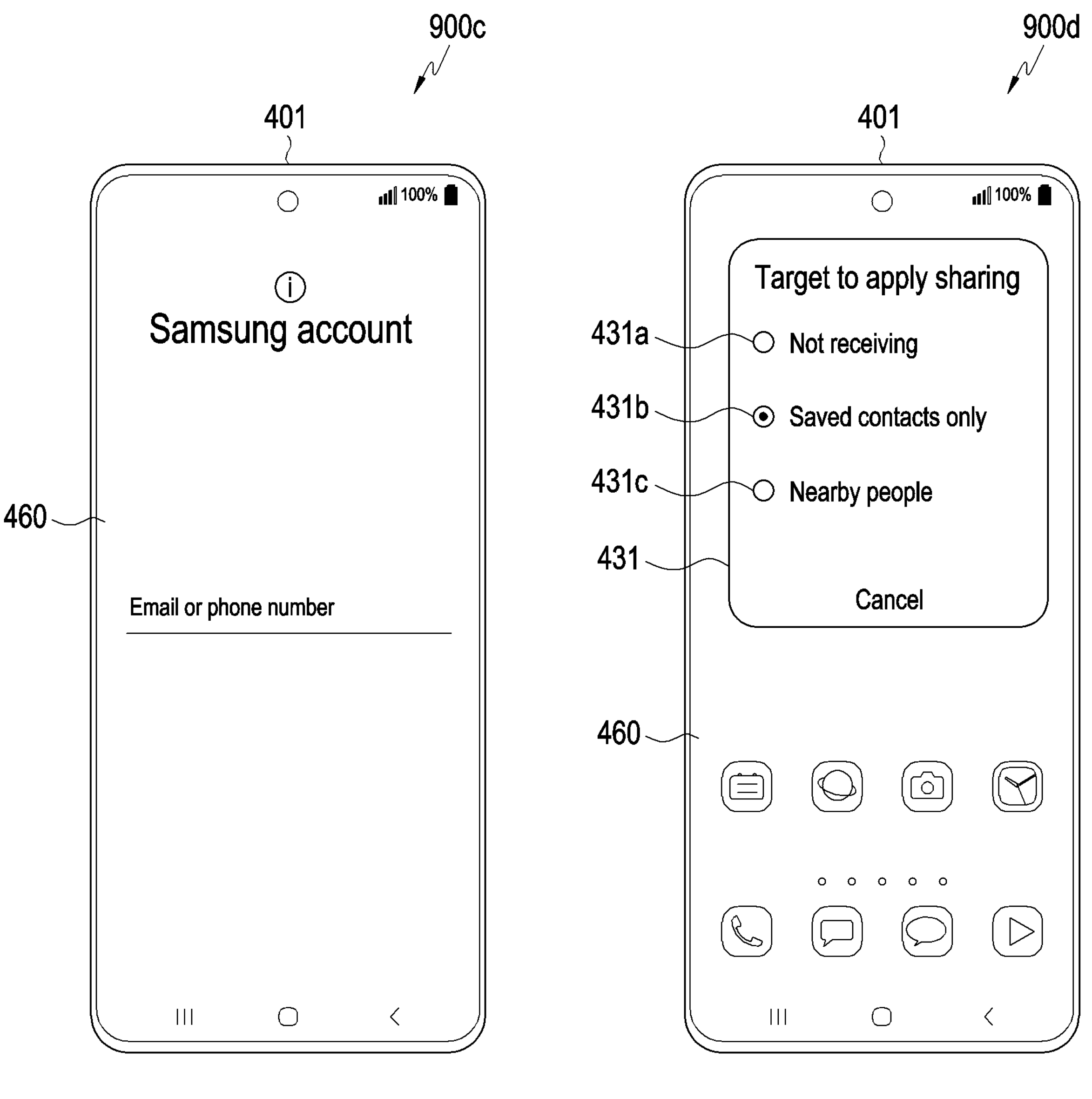

Referring to FIG. 9C, in diagram 900*c*, while controlling the display 460 of the second electronic device and displaying the UI 453 that induces logging in to the server account, the second electronic device 401 may log in to the server account as the user selects "OK" 453*b*. While being logged in to the server account, the second electronic device 401 may download, as certificate information, account information of the phone number included in the QR code data from the server, and update the buddy list of the second electronic device.

Referring to FIG. 9D, in diagram 900*d*, after updating the account information of the phone number included in the QR code data, which is received from the server, to the buddy list of the second electronic device, the second electronic device 401 may provide the UI 453 enabling selection of the second item 453*b* for configuring only a contact stored in an address book to be a sharing permitted target from among the sharing options for sharing permitted target configuration. Based on the user's selection for the second item 431*b* among the sharing options, the second electronic device 401 may transmit a search response packet to the first electronic device 301.

Figures 9E, 9F:
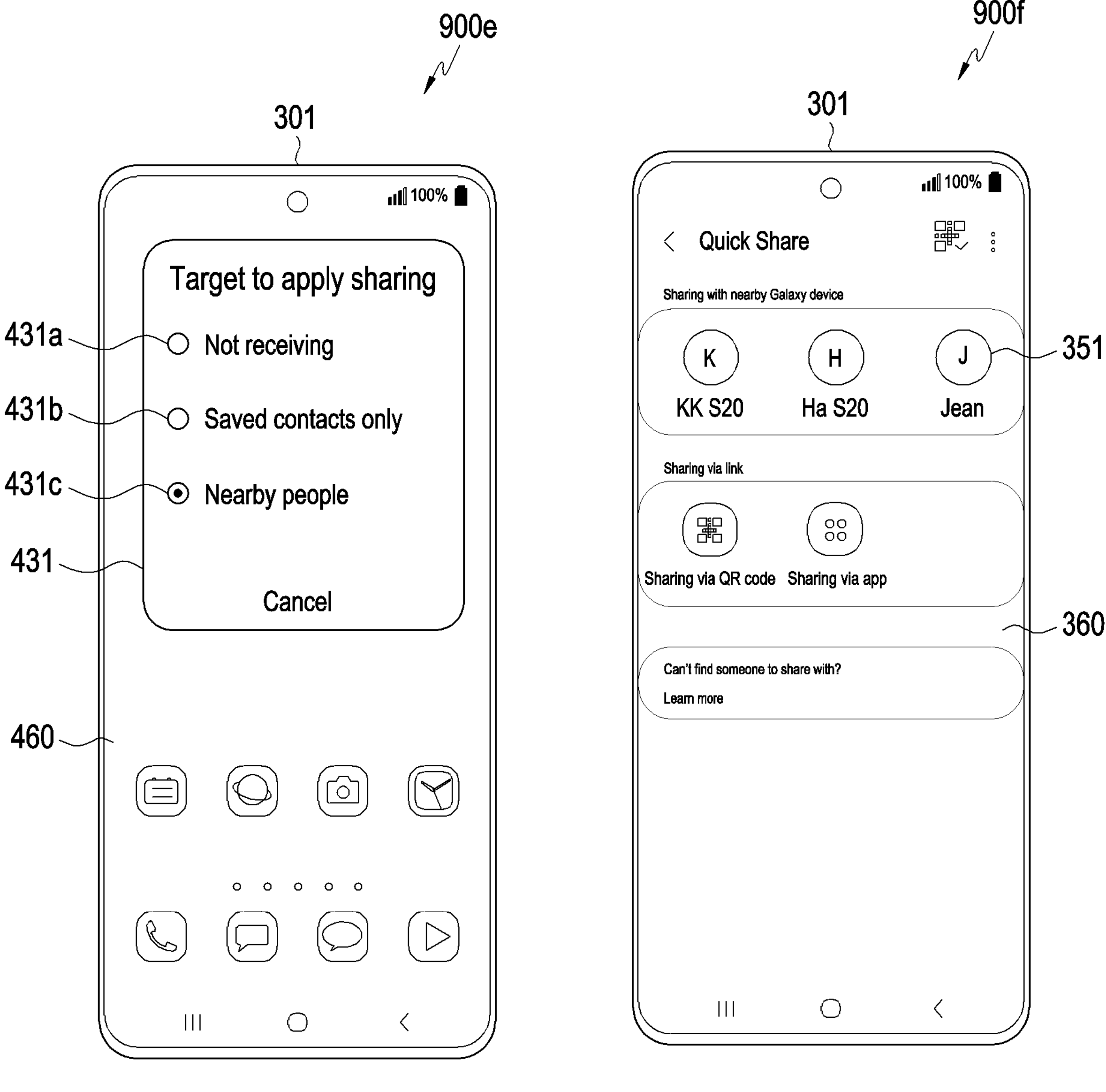

Referring to FIG. 9E, in diagram 900*e*, while controlling the display 460 of the second electronic device and displaying the UI 453 that induces logging into the server account, the second electronic device 401 may provide, as the user selects "Cancel" 453*a*, the UI 431 enabling selection of the third item 431*c* for configuring all nearby electronic devices to be sharing permitted targets from among the sharing options for sharing permitted target configuration. Based on the user's selection for the third item 431*c* among the sharing options, the second electronic device 401 may transmit a search response packet to the first electronic device 301.

Referring to FIG. 9F, in diagram 900*f*, in a state where the file transmission function (e.g., the D2D file transmission function) capable of transmitting a file to an external electronic device located in a short distance is executed, when the second electronic device 401 is not found before generation of QR code data, but a search response packet is received from the second electronic device 401 after generation of the QR code data, the first electronic device 301 may control the display 360 of the first electronic device 301 to display a search list including the information 351 of the second electronic device.

Figures 10A, 10B:
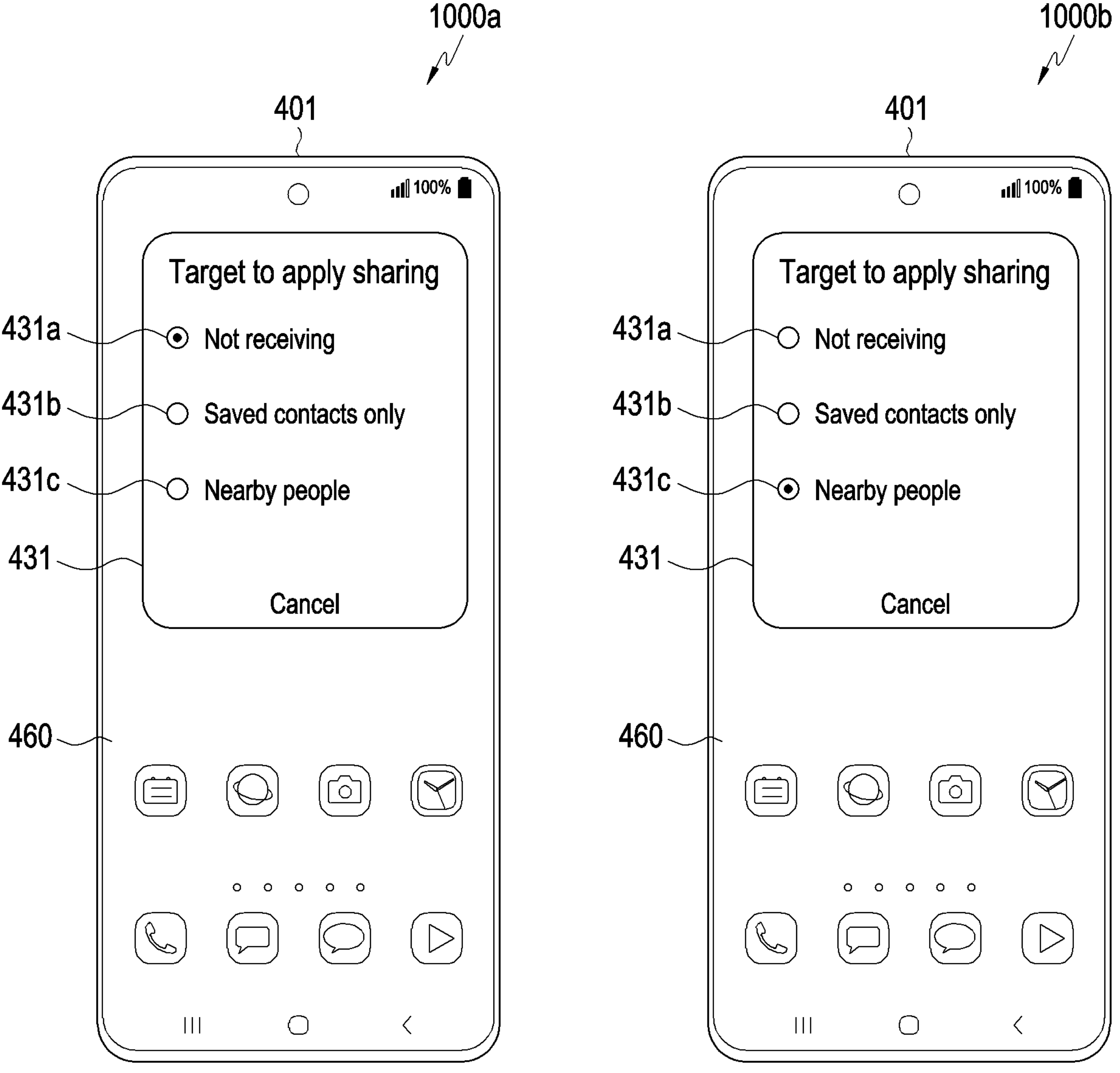
FIGS. 10A, 10B, and 10C are diagrams for illustrating an operation of configuring a sharing option for file transmission according to various embodiments of the disclosure.
Figure 10C:
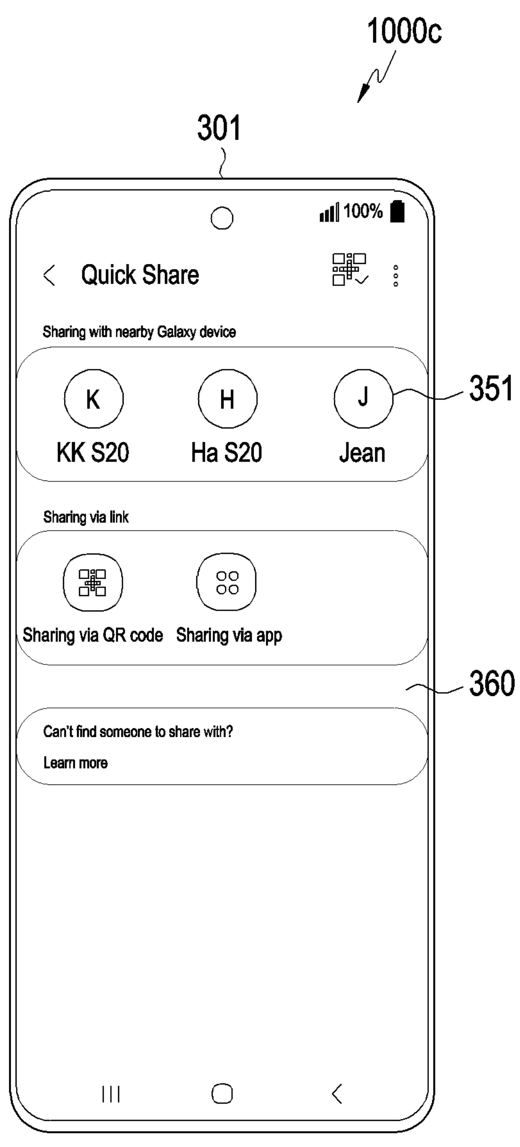

FIGS. 10A to 10C are diagrams for illustrating an operation of configuring a sharing option for file transmission according to various embodiments of the disclosure.

Referring to FIG. 10A, in diagram 1000*a*, in a state where the first item 431*a* for disabling a sharing permitted target has been configured among the sharing options 431 for sharing permitted target configuration, the second electronic device 401 (the second electronic device 401 of FIG. 2 and the electronic device 401 of FIG. 4) may determine, based on analysis of the QR code data generated by the first electronic device 301 (the first electronic device 301 of FIG. 2 and the electronic device 301 of FIG. 3), whether a condition that the certificate information of the QR code data does not exist in the buddy list of the second electronic device, the second electronic device has not been logged in to the server account, and the phone number included in the QR code data does not exist in the address book is satisfied.

Referring to FIG. 10B, in diagram 1000*b*, if the condition that the certificate information of the QR code data does not exist in the buddy list of the second electronic device, the second electronic device has not been logged in to the server account, and the phone number included in the QR code data does not exist in the address book is satisfied, the second electronic device 401 may provide the UI 431 enabling selection of the third item 431*c* for configuring all nearby electronic devices to be sharing permitted targets from among the sharing options for sharing permitted target configuration. Based on the user's selection for the third item 431*c* among the sharing options, the second electronic device 401 may transmit a search response packet to the first electronic device 301.

Referring to FIG. 10C, in diagram 1000*c*, in a state where the file transmission function (e.g., the D2D file transmission function) capable of transmitting a file to an external electronic device located in a short distance is executed, when the second electronic device 401 is not found before generation of QR code data, but a search response packet is received from the second electronic device 401 after generation of the QR code data, the first electronic device 301 may control the display 360 of the first electronic device 301 to display a search list including the information 351 of the second electronic device.

A system for file transmission according to an embodiment may include a first electronic device (301 of FIG. 2; 301 of FIG. 3) configured to, when a second electronic device for file transmission is not found, generate QR code data including information for changing the first electronic device to a sharing permitted target, and broadcast a packet for a QR code scan request.

The system for file transmission according to an embodiment may include the second electronic device (401 of FIG. 3; 401 of FIG. 4) configured to, when the packet for the QR code scan request is received from the first electronic device, scan the QR code data of the first electronic device, and based on analysis of the scanned QR code data, provide a UI enabling selection of a sharing option that allows the first electronic device to be configured as a sharing permitted target.

According to an embodiment, the information for changing the first electronic device to the sharing permitted target, which is included in the QR code data, may include at least one of certificate information or a phone number.

The second electronic device (401 of FIG. 2; 401 of FIG. 4) according to an embodiment may be configured to, in a state where a first item for disabling a sharing permitted target has been configured among sharing options for sharing permitted target configuration, provide the UI enabling selection of a second item for configuring only a contact stored in an address book to be a sharing permitted target, based on a condition of satisfying at least one of a condition that the certificate information included in the QR code data exists in a buddy list of the second electronic device, a condition of identifying a user's selection to store the phone number, which is included in the QR code data, in an address book when the certificate information included in the QR code data does not exist in the buddy list of the second electronic device and the second electronic device has been logged in to a server account, or a condition that the phone number included in the QR code data exists in the address book when the certificate information included in the QR code data does not exist in the buddy list of the second electronic device and the second electronic device has not been logged in to the server account.

The second electronic device (401 of FIG. 2; 401 of FIG. 4) according to an embodiment may be configured to, in a state where the second item for configuring only a contact stored in an address book to be a sharing permitted target is configured, store the phone number, which is included in the QR code data, in the address book when a condition of identifying the user's selection to store the phone number, which is included in the QR code data, in the address book is satisfied, and provide the UI enabling selection of a third item for configuring all nearby electronic devices to be sharing permitted targets when the condition of identifying the user's selection to store the phone number, which is included in the QR code data, in the address book cannot be satisfied.

An electronic device according to an embodiment may include communication circuitry (190 of FIG. 1; 390 of FIG. 3), a display (160 of FIG. 1; 360 of FIG. 3), and a processor (120 of FIG. 1; 320 of FIG. 3).

The processor according to an embodiment may be configured to broadcast a search request packet for searching for an external electronic device for file transmission via the communication circuitry, and if reception of a search response packet from the external electronic device fails, generate QR code data including information for changing the electronic device to a sharing permitted target, broadcast a packet for a QR code scan request, and control the display to display the generated QR code data.

According to an embodiment, the information for changing the first electronic device to the sharing permitted target, which is included in the QR code data, may include at least one of certificate information or a phone number.

An electronic device according to an embodiment may include communication circuitry (190 of FIG. 1; 490 of FIG. 4), a camera module (180 of FIG. 1; 480 of FIG. 4), a display (160 of FIG. 1; 460 of FIG. 4), and a processor (120 of FIG. 1; 420 of FIG. 4).

The processor (120 of FIG. 1; 420 of FIG. 4) according to an embodiment may be configured to, when a packet for a QR code scan request is received from an external electronic device via the communication circuitry, scan QR code data of the external electronic device via the camera, and based on analysis of the scanned QR code data, control the display to provide a UI enabling selection of a sharing option that allows the external electronic device to be configured as a sharing permitted target.

The processor (120 of FIG. 1; 420 of FIG. 4) according to an embodiment may be configured to, in a state where a first item for disabling a sharing permitted target has been configured among sharing options for sharing permitted target configuration, provide the UI enabling selection of a second item for configuring only a contact stored in an address book to be a sharing permitted target, at satisfaction of at least one condition among a condition that certificate information included in the QR code data exists in a buddy list of the second electronic device, a condition that the certificate information included in the QR code data does not exist in the buddy list of the second electronic device, the second electronic device has been logged in to a server account, and a user's selection to store a phone number, which is included in the QR code data, in an address book is identified, and a condition that the certificate information included in the QR code data does not exist in the buddy list of the second electronic device, the second electronic device has not been logged in to the server account, the phone number included in the QR code data exists in the address book.

The processor (120 of FIG. 1; 420 of FIG. 4) according to an embodiment may be configured to, in the state where the first item for disabling a sharing permitted target has been configured among the sharing options for sharing permitted target configuration, provide the UI enabling selection of a third item for configuring all nearby electronic devices to be sharing permitted targets, upon satisfaction of at least one condition of a condition that the certificate information included in the QR code data does not exist in the buddy list of the second electronic device, the second electronic device has been logged in to the server account, and the user's selection to store the phone number, which is included in the QR code data, in the address book is not identified, or a condition that the certificate information included in the QR code data does not exist in the buddy list of the second electronic device, the second electronic device has not been logged in to the server account, and the phone number included in the QR code data does not exist in the address book.

The processor (120 of FIG. 1; 420 of FIG. 4) according to an embodiment may be configured to, in a state where the second item for configuring only a contact stored in an address book to be a sharing permitted target is configured, store the phone number, which is included in the QR code data, in the address book when a condition of identifying the user's selection to store the phone number, which is included in the QR code data, in the address book is satisfied, and provide the UI enabling selection of the third item for configuring all nearby electronic devices to be sharing permitted targets when a condition of being unable to identify the user's selection to store the phone number, which is included in the QR code data, in the address book is satisfied.

Figure 11:
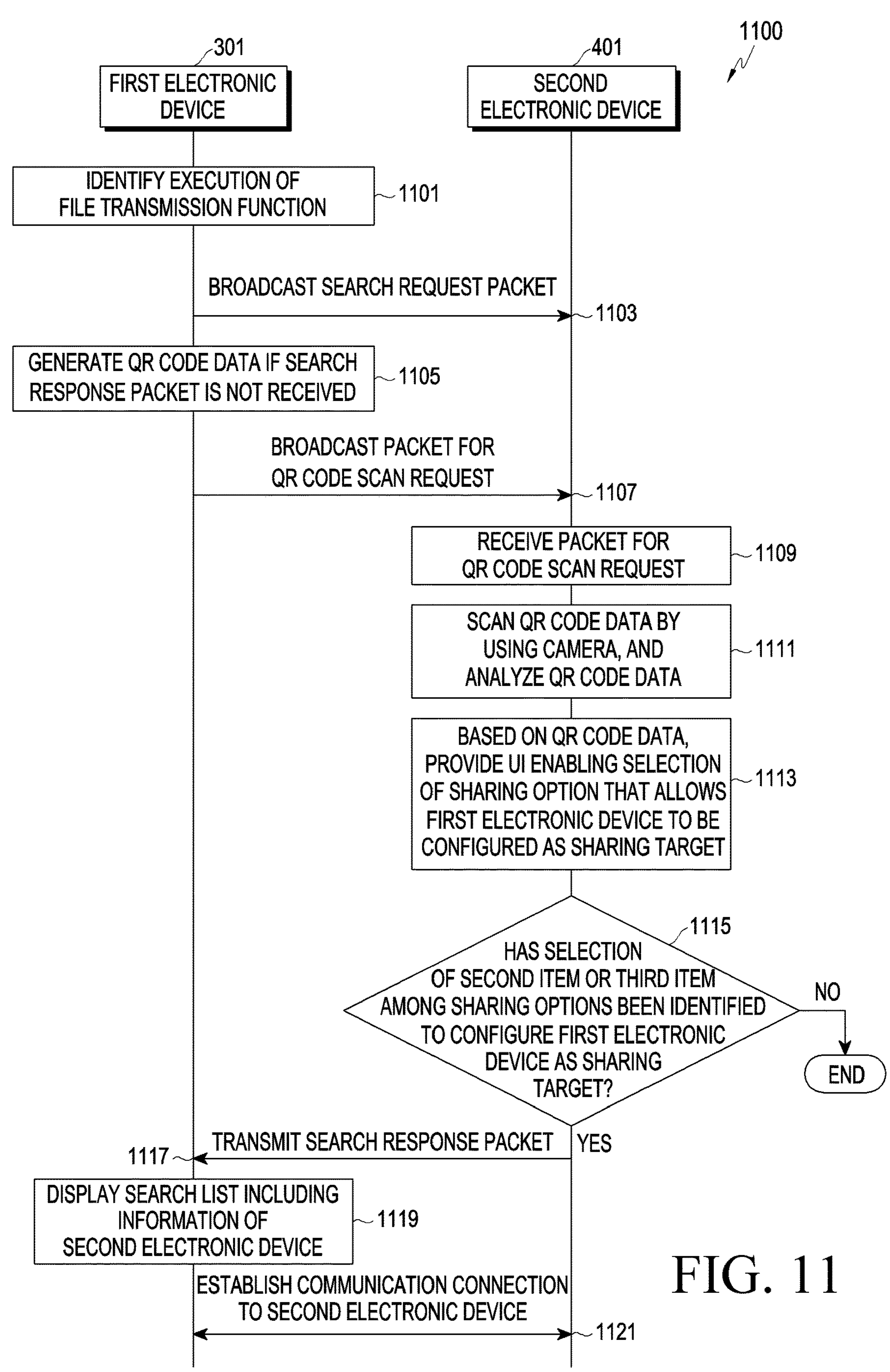
FIG. 11 is a flowchart for illustrating a file transmission operation according to an embodiment of the disclosure.

FIG. 11 is a flowchart for illustrating file transmission operations according to an embodiment of the disclosure. The file transmission operations may include operations 1101 to 1121. In the following embodiments, the respective operations may be sequentially performed, but are not necessarily performed sequentially. For example, the order of the respective operations may be changed, at least two actions may be performed in parallel, or another operation may be added.

Referring to FIG. 11, in a method 1100, in operation 1101, the first electronic device 301 (e.g., the first electronic device 301 of FIG. 2 and/or the first electronic device 301 of FIG. 3) may identify execution of a file transmission function.

According to an embodiment, the first electronic device 301 may identify execution of the file transmission function (e.g., the D2D file transmission function) capable of transmitting a file to an external electronic device located in a short distance.

In operation 1103, the first electronic device 301 (e.g., the first electronic device 301 of FIG. 2 and/or the first electronic device 301 of FIG. 3) may broadcast a search request packet.

According to an embodiment, the first electronic device 301 may broadcast the search request packet (e.g., an advertisement packet) at low power by using a Bluetooth low energy (BLE) communication module included in a communication module (e.g., the first communication module 390 of FIG. 3) of the first electronic device.

In operation 1105, the first electronic device 301 (e.g., the first electronic device 301 of FIG. 2 and/or the first electronic device 301 of FIG. 3) may generate QR code data if no search response packet is received.

According to an embodiment, if a search response packet cannot be received from the second electronic device 401, which is the external electronic device, in response to the search request packet broadcast via the communication module (e.g., the first communication module 390 of FIG. 3) of the first electronic device, the first electronic device 301 may generate the QR code data including information for changing the first electronic device 301 to a sharing permitted target, and control a display (e.g., the first display 360) of the first electronic device to display the generated QR code data.

According to an embodiment, the QR code data including the information for changing the first electronic device 301 to the sharing permitted target may include at least one of certificate information of the first electronic device or a phone number of the first electronic device.

In operation 1107, the first electronic device 301 (e.g., the first electronic device 301 of FIG. 2 and/or the first electronic device 301 of FIG. 3) may broadcast a packet for a QR code scan request.

According to an embodiment, the first electronic device 301 may broadcast the packet for the QR code scan request at low power by using the Bluetooth low energy (BLE) communication module included in the communication module (e.g., the first communication module 390 of FIG. 3) of the first electronic device.

In operation 1109, the second electronic device 401 (e.g., the second electronic device 401 of FIG. 2 and/or the second electronic device 401 of FIG. 4) may receive the packet for the QR code scan request.

According to an embodiment, the second electronic device 401 may receive the packet for the QR code scan request via a Bluetooth low energy (BLE) communication module included in a communication module (e.g., the second communication module 490 of FIG. 4) of the second electronic device.

In operation 1111, the second electronic device 401 (e.g., the second electronic device 401 of FIG. 2 and/or the second electronic device 401 of FIG. 4) may scan the QR code data by using a camera, and analyze the QR code data.

According to an embodiment, when a QR code data scan function is enabled upon reception of the packet for the QR code scan request, the second electronic device 401 may scan the QR code data being displayed on the display of the first electronic device 301 by using the camera (e.g., the second camera 480 of FIG. 4) of the second electronic device.

According to an embodiment, the second electronic device 401 may parse and analyze the scanned QR code data.

In operation 1113, the second electronic device 401 (e.g., the second electronic device 401 of FIG. 2 and/or the second electronic device 401 of FIG. 4) may provide, based on the QR code data, a UI enabling selection of a sharing option that allows the first electronic device to be configured as a sharing target.

According to an embodiment, the sharing option enabling configuration as a sharing permitted target may include a first item for disabling a sharing permitted target (e.g., a state where all sharing permitted targets are turned off), a second item for configuring only a contact stored in an address book to be a sharing permitted target, and/or a third item for configuring all nearby electronic devices to be sharing permitted targets.

According to an embodiment, when the first item for disabling a sharing permitted target, among the sharing options for sharing permitted target configuration, has been configured for the electronic device 401, the second electronic device 401 may control the display (e.g., the second display 460 of FIG. 4) of the second electronic device to display the UI enabling selection of the second item for configuring only a contact stored in an address book to be a sharing permitted target or the third item for configuring all nearby electronic devices to be sharing permitted targets.

If selection of the second item or the third item, among the sharing options, for configuring the first electronic device to be a sharing target is identified in operation 1115, the second electronic device 401 (e.g., the second electronic device 401 of FIG. 2 and/or the second electronic device 401 of FIG. 4) may transmit a search response packet in operation 1117.

According to an embodiment, the second electronic device 401 may transmit the search response packet via the Bluetooth low energy (BLE) communication module included in the communication module (e.g., the second communication module 490 of FIG. 4) of the second electronic device.

In operation 1119, the first electronic device 301 (e.g., the first electronic device 301 of FIG. 2 and/or the first electronic device 301 of FIG. 3) may display a search list including information of the second electronic device.

According to an embodiment, when the search response packet is received from the second electronic device 401, the first electronic device 301 may update, based on a search result, the search list including the information of the second electronic device, and control the display (e.g., the first display 360) of the first electronic device to display the updated search list.

In operation 1121, the first electronic device 301 (e.g., the first electronic device 301 of FIG. 2 and/or the first electronic device 301 of FIG. 3) may establish a communication connection to the second electronic device 401.

According to an embodiment, if selection of the second electronic device 401 is identified from the search list, the first electronic device 301 may receive connection information for file transmission during authentication with the second electronic device, and based on the connection information, may establish a communication connection to the second electronic device 401 by using a short-range communication technology (e.g., Wi-Fi-direct or Wi-Fi-aware) and then transmit a file selected by a user to the second electronic device 401.

In FIG. 11, the first electronic device 301 may broadcast multiple search request packets, and the second electronic device 401 may transmit the search response packet to the first electronic device 301 in a state where the first electronic device is permitted as a sharing target (e.g., when the second item for configuring only a contact stored in an address book to be a sharing permitted target or the third item for configuring all nearby electronic to be sharing permitted targets is configured).

Figure 12:
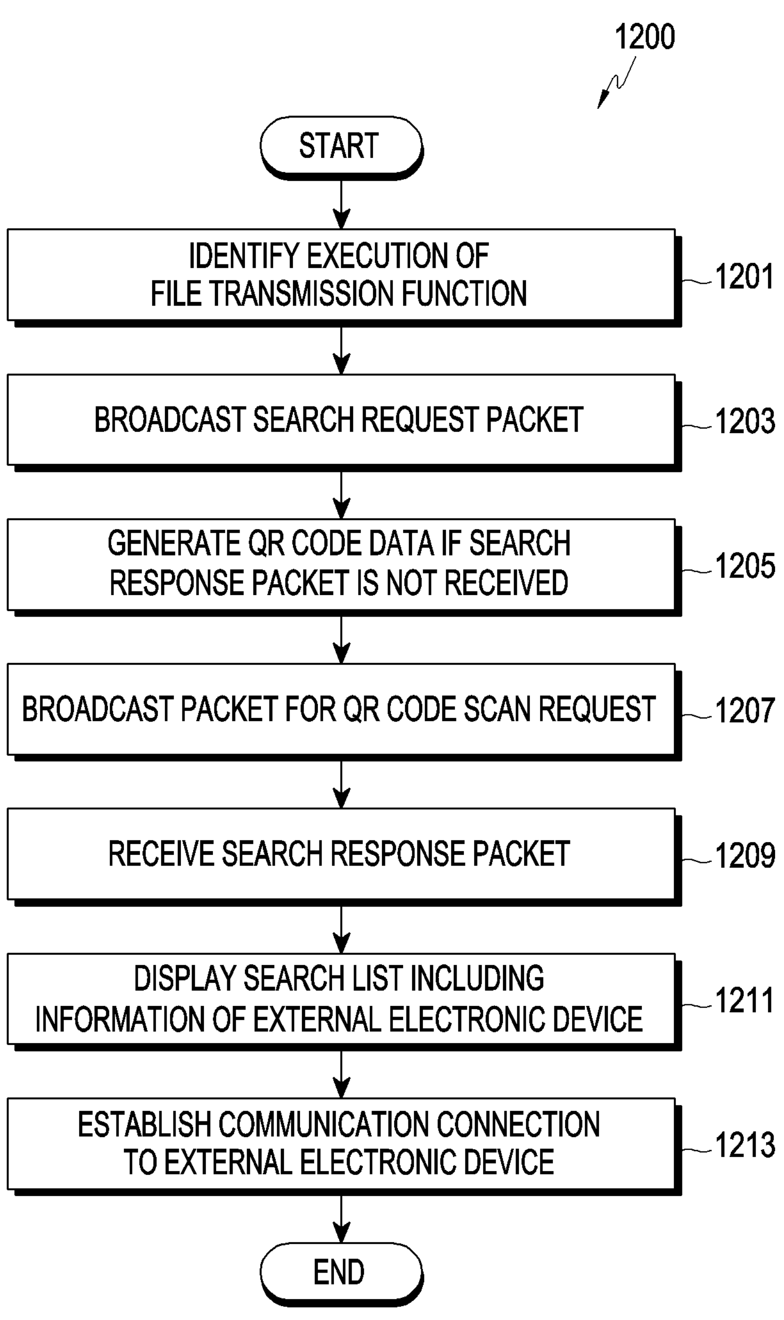
FIG. 12 is a flowchart for illustrating a file transmission operation in an electronic device according to an embodiment of the disclosure.

FIG. 12 is a flowchart for illustrating file transmission operations according to an embodiment of the disclosure. The file transmission operations may include operations 1201 to 1213. In the following embodiments, the respective operations may be sequentially performed, but are not necessarily performed sequentially. For example, the order of the respective operations may be changed, at least two actions may be performed in parallel, or another operation may be added.

Referring to FIG. 12, in a method 1200, n operation 1201, an electronic device (e.g., the first electronic device 301 of FIG. 2 and/or the first electronic device 301 of FIG. 3) may identify execution of a file transmission function.

According to an embodiment, the electronic device may identify execution of the file transmission function (e.g., the D2D file transmission function) capable of transmitting a file to an external electronic device located in a short distance.

In operation 1203, the electronic device (e.g., the first electronic device 301 of FIG. 2 and/or the first electronic device 301 of FIG. 3) may broadcast a search request packet (e.g., an advertisement packet).

According to an embodiment, the electronic device may broadcast the search request packet (e.g., the advertisement packet) at low power by using a Bluetooth low energy (BLE) communication module included in a communication module (e.g., the first communication module 390 of FIG. 3) of the electronic device.

In operation 1205, the electronic device 301 (e.g., the first electronic device 301 of FIG. 2 and/or the first electronic device 301 of FIG. 3) may generate QR code data if no search response packet is received.

According to an embodiment, if a search response packet cannot be received from an external electronic device (e.g., the second electronic device 401 of FIG. 2 and/or the second electronic device 401 of FIG. 4) in response to the search request packet broadcast via the communication module (e.g., the first communication module 390 of FIG. 3) of the electronic device, the electronic device 301 may generate the QR code data including information for changing the electronic device to a sharing permitted target, and control a display (e.g., the first display 360) of the electronic device to display the generated QR code data.

According to an embodiment, the QR code data including the information for changing the electronic device to the sharing permitted target may include at least one of certificate information of the electronic device or a phone number of the electronic device.

In operation 1207, the electronic device (e.g., the first electronic device 301 of FIG. 2 and/or the first electronic device 301 of FIG. 3) may broadcast a packet for a QR code scan request.

According to an embodiment, the electronic device may broadcast the packet for the QR code scan request at low power by using the Bluetooth low energy (BLE) communication module included in the communication module (e.g., the first communication module 390 of FIG. 3) of the electronic device.

In operation 1209, the electronic device (e.g., the first electronic device 301 of FIG. 2 and/or the first electronic device 301 of FIG. 3) may receive a search response packet.

According to an embodiment, based on the QR code data generated by the electronic device, a search response packet may be received from the external electronic device (e.g., the second electronic device 401 of FIG. 2 and/or the second electronic device 401 of FIG. 4) which has configured the electronic device to be a sharing permitted target.

In operation 1211, the electronic device (e.g., the first electronic device 301 of FIG. 2 and/or the first electronic device 301 of FIG. 3) may display a search list including information of the external electronic device.

According to an embodiment, when the search response packet is received from the external electronic device (e.g., the second electronic device 401 of FIG. 2 and/or the second electronic device 401 of FIG. 4), the electronic device may update, based on a search result, the search list including the information of the external electronic device, and control the display (e.g., the first display 360) of the electronic device to display the updated search list.

In operation 1213, the electronic device (e.g., the first electronic device 301 of FIG. 2 and/or the first electronic device 301 of FIG. 3) may be connected to communicate with the external electronic device.

According to an embodiment, if selection of the external electronic device (e.g., the second electronic device 401 of FIG. 2 and/or the second electronic device 401 of FIG. 4) is identified from the search list, the electronic device may receive connection information for file transmission during authentication with the external electronic device, and based on the connection information, may establish a communication connection to the external electronic device by using a short-range communication technology (e.g., Wi-Fi-direct or Wi-Fi-aware) and then transmit a file selected by a user to the external electronic device.

Figure 13A:
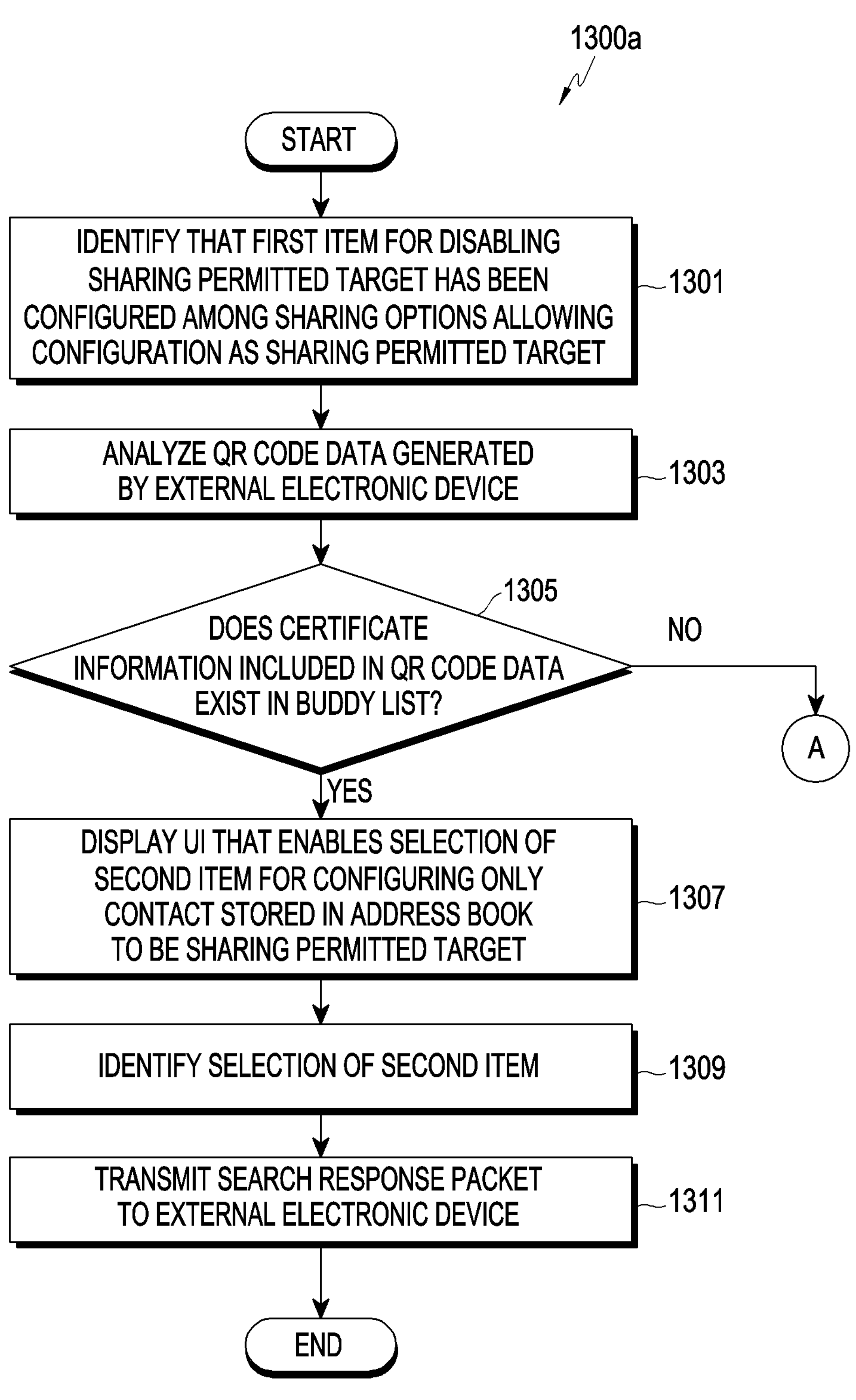
FIGS. 13A, 13B, and 13C are flowcharts for illustrating a file transmission operation in an electronic device according to various embodiments of the disclosure.
Figure 13B:
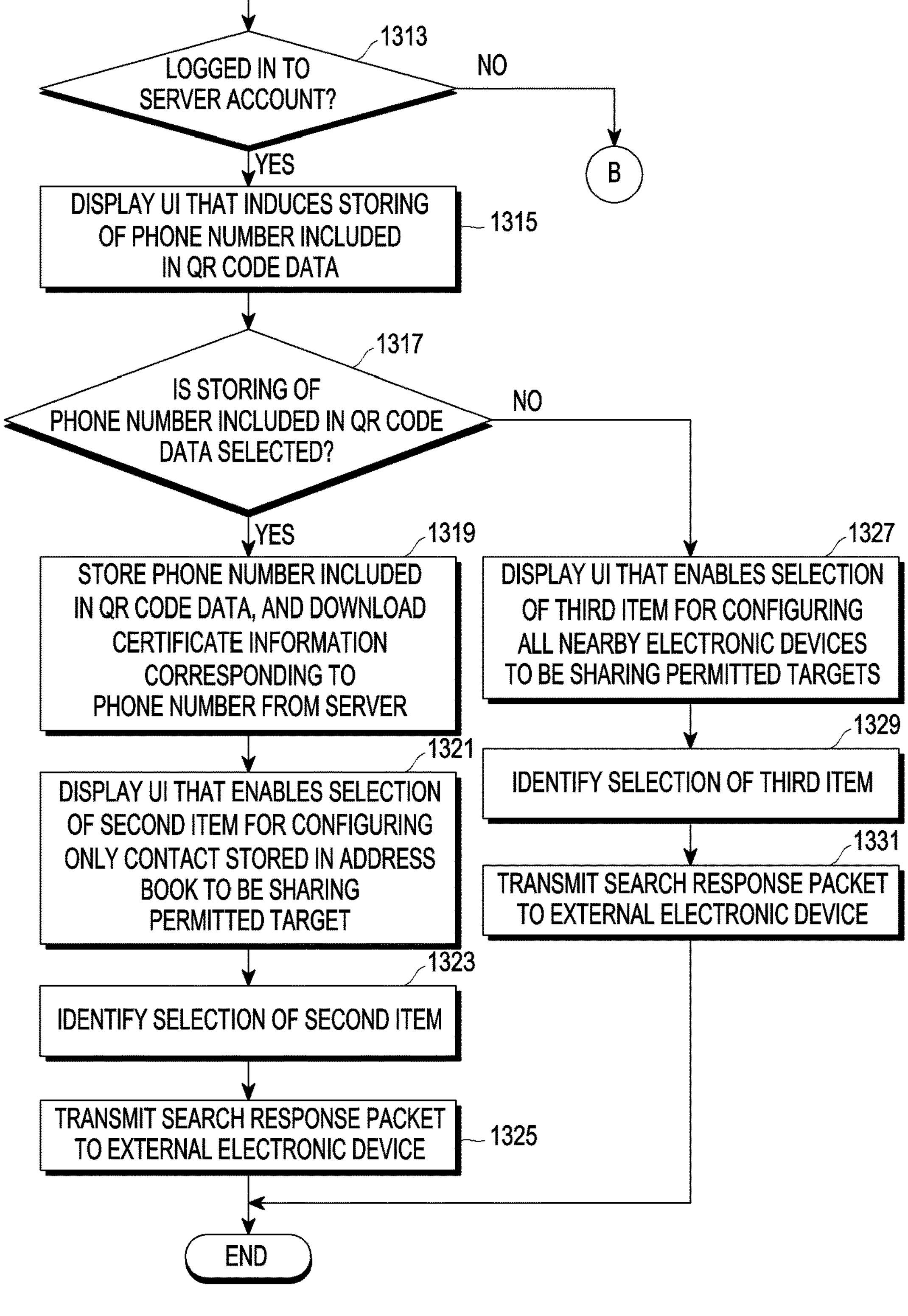
Figure 13C:
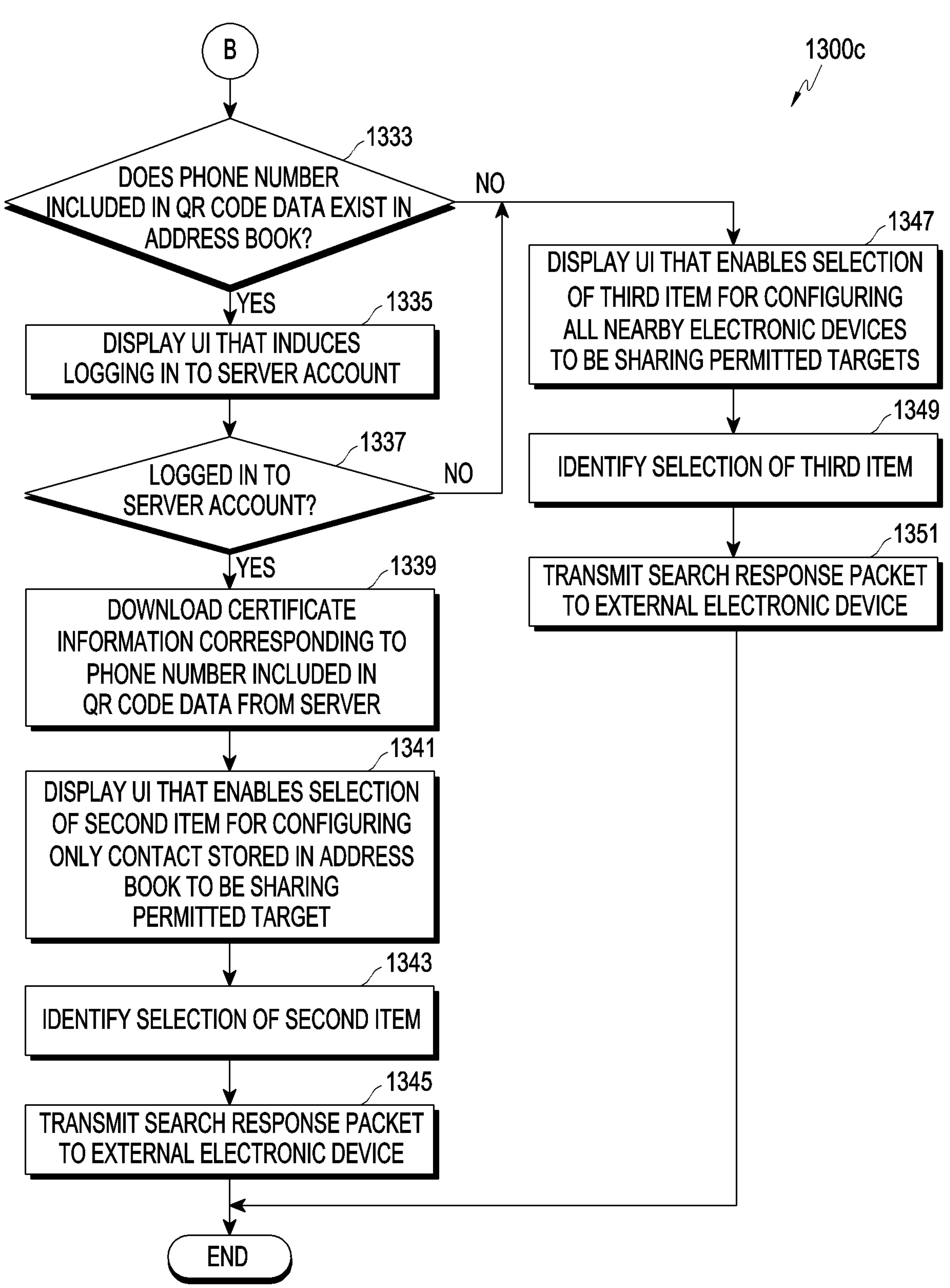

FIGS. 13A to 13C are flowcharts for illustrating file transmission operations in an electronic device according to various embodiments of the disclosure. The file transmission operations may include operations 1301 to 1351. In the following embodiments, the respective operations may be sequentially performed, but are not necessarily performed sequentially. For example, the order of the respective operations may be changed, at least two actions may be performed in parallel, or another operation may be added.

Referring to FIG. 13A-13C, in flowcharts 1300*a*, 1300*b* and 1300*c*, in operation 1301, an electronic device (e.g., the second electronic device 401 of FIG. 2 and/or the second electronic device 401 of FIG. 4) may identify that a first item (e.g., a state where all sharing permitted targets are turned off) for disabling a sharing permitted target has been configured among sharing options by which the electronic device may configure a sharing permitted target.

According to an embodiment, when a packet for a QR code scan request is received from an external electronic device (e.g., the first electronic device 301 of FIG. 2 and/or the first electronic device 301 of FIG. 3), the electronic device may identify that the first item (e.g., a state where all sharing permitted targets are turned off) for disabling a sharing permitted target has been configured among the sharing options by which the electronic device may configure a sharing permitted target.

According to an embodiment, the electronic device may receive the packet for the QR code scan request, which has been broadcast by the external electronic device, via a Bluetooth low energy (BLE) communication module included in a communication module (e.g., the second communication module 490 of FIG. 4) of the electronic device.

According to an embodiment, the sharing options enabling configuration as a sharing permitted target may include a first item for disabling a sharing permitted target (e.g., a state where all sharing permitted targets are turned off), a second item for configuring only a contact stored in an address book to be a sharing permitted target, and/or a third item for configuring all nearby electronic devices to be sharing permitted targets.

In operation 1303, the electronic device (e.g., the second electronic device 401 of FIG. 2 and/or the second electronic device 401 of FIG. 4) may analyze QR code data generated by the external electronic device (e.g., the first electronic device 301 of FIG. 2 and/or the first electronic device 301 of FIG. 3).

According to an embodiment, when a QR code data scan function is enabled upon reception of the packet for the QR code scan request, the electronic device may scan the QR code data being displayed on a display of the external electronic device by using a camera (e.g., the second camera 480 of FIG. 4) of the electronic device.

According to an embodiment, the electronic device may parse and analyze the scanned QR code data.

In operation 1305, the electronic device (e.g., the second electronic device 401 of FIG. 2 and/or the second electronic device 401 of FIG. 4) may identify whether certificate information included in the QR code data exists in a buddy list.

If it is identified, in operation 1305, that the certificate information included in the QR code data exists in the buddy list, the electronic device (e.g., the second electronic device 401 of FIG. 2 and/or the second electronic device 401 of FIG. 4) may, in operation 1307, control a display (e.g., the second display 460) of the electronic device to display a UI enabling selection of the second item for configuring only a contact stored in an address book to be a sharing permitted target. The existence of the certificate information, which is included the QR code data, in the buddy list may indicate that a phone number corresponding to the certificate information exists in the buddy list.

If selection of the second item is identified in operation 1309, the electronic device (e.g., the second electronic device 401 of FIG. 2 and/or the second electronic device 401 of FIG. 4) may transmit a search response packet to the external electronic device (e.g., the first electronic device 301 of FIG. 2 and/or the first electronic device 301 of FIG. 3) in operation 1311.

According to an embodiment, if selection of the second item is identified, the electronic device may transmit the search response packet to the external electronic device via the Bluetooth low energy (BLE) communication module included in the communication module (e.g., the second communication module 490 of FIG. 4) of the electronic device.

According to an embodiment, the electronic device may receive connection information for file transmission during authentication with the external electronic device, establish a communication connection to the external electronic device by using a short-range communication technology (e.g., Wi-Fi-direct or Wi-Fi-aware) based on the connection information, and then receive a file from the external electronic device. If it is identified, in operation 1305, that the certificate information included in the QR code data does not exist in the buddy list, the electronic device (e.g., the second electronic device 401 of FIG. 2 and/or the second electronic device 401 of FIG. 4) may identify, in operation 1313, whether the electronic device has been logged in to a server account.

If it is identified, in operation 1313, that the electronic device has been logged in to the server account, the electronic device (e.g., the second electronic device 401 of FIG. 2 and/or the second electronic device 401 of FIG. 4) may display a UI that induces storing of the phone number included in the QR code data.

If selection of storing the phone number included in the QR code data is identified in operation 1317, the electronic device (e.g., the second electronic device 401 of FIG. 2 and/or the second electronic device 401 of FIG. 4) may, in operation 1319, store the phone number included in the QR code data and download certificate information corresponding to the phone number from a server.

According to an embodiment, the electronic device may update the buddy list by downloading authentication information of account information corresponding to the phone number included in the QR code data from the server in response to a request of the electronic device.

In operation 1321, the electronic device (e.g., the second electronic device 401 of FIG. 2 and/or the second electronic device 401 of FIG. 4) may control the display (e.g., the second display 460) of the electronic device to display the UI enabling selection of the second item for configuring only a contact stored in an address book to be a sharing permitted target.

If selection of the second item is identified in operation 1323, the electronic device (e.g., the second electronic device 401 of FIG. 2 and/or the second electronic device 401 of FIG. 4) may transmit a search response packet to the external electronic device (e.g., the first electronic device 301 of FIG. 2 and/or the first electronic device 301 of FIG. 3) in operation 1325.

According to an embodiment, if selection of the second item is identified, the electronic device may transmit the search response packet to the external electronic device via the Bluetooth low energy (BLE) communication module included in the communication module (e.g., the second communication module 490 of FIG. 4) of the electronic device.

According to an embodiment, the electronic device may receive connection information for file transmission during authentication with the external electronic device, establish a communication connection to the external electronic device by using a short-range communication technology (e.g., Wi-Fi-direct or Wi-Fi-aware) based on the connection information, and then receive a file from the external electronic device.

If selection of storing the phone number included in the QR code data cannot be identified in operation 1317, the electronic device (e.g., the second electronic device 401 of FIG. 2 and/or the second electronic device 401 of FIG. 4) may, in operation 1327, control the display (e.g., the second display 460) of the electronic device to display the UI enabling selection of the third item for configuring all nearby electronic devices to be sharing permitted targets.

If selection of the third item is identified in operation 1329, the electronic device (e.g., the second electronic device 401 of FIG. 2 and/or the second electronic device 401 of FIG. 4) may transmit a search response packet to the external electronic device (e.g., the first electronic device 301 of FIG. 2 and/or the first electronic device 301 of FIG. 3) in operation 1331.

According to an embodiment, the electronic device may receive connection information for file transmission during authentication with the external electronic device, establish a communication connection to the external electronic device by using a short-range communication technology (e.g., Wi-Fi-direct or Wi-Fi-aware) based on the connection information, and then receive a file from the external electronic device.

If it is identified, in operation 1313, that the electronic device has not been logged in to the server account, the electronic device (e.g., the second electronic device 401 of FIG. 2 and/or the second electronic device 401 of FIG. 4) may identify, in operation 1333, whether the phone number included in the QR code data exists in an address book of the electronic device.

If it is identified, in operation 1333, that the phone number included in the QR code data exists in the address book of the electronic device, the electronic device (e.g., the second electronic device 401 of FIG. 2 and/or the second electronic device 401 of FIG. 4) may, in operation 1335, control the display (e.g., the second display 460) of the electronic device to display the UI that induces logging in to the server account.

In operation 1337, the electronic device (e.g., the second electronic device 401 of FIG. 2 and/or the second electronic device 401 of FIG. 4) may identify whether the electronic device has been logged in to the server account.

If the electronic device (e.g., the second electronic device 401 of FIG. 2 and/or the second electronic device 401 of FIG. 4) is logged in to the server account by the user's selection in operation 1337, the electronic device may download certificate information corresponding to the phone number included in the QR code data from the server in operation 1339.

According to an embodiment, while the electronic device is being logged in to the server, the electronic device may download, as certificate information, account information of the phone number included in the QR code data so as to update the buddy list of the electronic device.

In operation 1341, the electronic device (e.g., the second electronic device 401 of FIG. 2 and/or the second electronic device 401 of FIG. 4) may control the display (e.g., the second display 460) of the electronic device to display the UI enabling selection of the second item for configuring only a contact stored in an address book to be a sharing permitted target.

If selection of the second item is identified in operation 1343, the electronic device (e.g., the second electronic device 401 of FIG. 2 and/or the second electronic device 401 of FIG. 4) may transmit a search response packet to the external electronic device (e.g., the first electronic device 301 of FIG. 2 and/or the first electronic device 301 of FIG. 3) in operation 1345.

According to an embodiment, if selection of the second item is identified, the electronic device may transmit the search response packet to the external electronic device via the Bluetooth low energy (BLE) communication module included in the communication module (e.g., the second communication module 490 of FIG. 4) of the electronic device.

According to an embodiment, the electronic device may receive connection information for file transmission during authentication with the external electronic device, establish a communication connection to the external electronic device by using a short-range communication technology (e.g., Wi-Fi-direct or Wi-Fi-aware) based on the connection information, and then receive a file from the external electronic device.

If it is identified, in operation 1333, that the phone number included in the QR code data does not exist in the address book of the electronic device, or it is identified, in operation 1337, that the electronic device has not been logged in to the server account by the user, the electronic device (e.g., the second electronic device 401 of FIG. 2 and/or the second electronic device 401 of FIG. 4) may, in operation 1347, control the display (e.g., the second display 460) of the electronic device to display the UI enabling selection of the third item for configuring all nearby electronic devices to be sharing permitted targets.

If selection of the third item is identified in operation 1349, the electronic device (e.g., the second electronic device 401 of FIG. 2 and/or the second electronic device 401 of FIG. 4) may transmit a search response packet to the external electronic device (e.g., the first electronic device 301 of FIG. 2 and/or the first electronic device 301 of FIG. 3) in operation 1351.

According to an embodiment, the electronic device may receive connection information for file transmission during authentication with the external electronic device, establish a communication connection to the external electronic device by using a short-range communication technology (e.g., Wi-Fi-direct or Wi-Fi-aware) based on the connection information, and then receive a file from the external electronic device.

According to an embodiment, if it is identified, in operation 1333, that the phone number included in the QR code data exists in the address book of the electronic device, the electronic device (e.g., the second electronic device 401 of FIG. 2 and/or the second electronic device 401 of FIG. 4) may not perform operations 1335 to 1339, and may, in operation 1341, control the display (e.g., the second display 460) of the electronic device to display the UI enabling selection of the second item for configuring only a contact stored in an address book to be a sharing permitted target. The electronic device may perform operations 1335 to 1339 after performing operation 1345.

Figure 14:
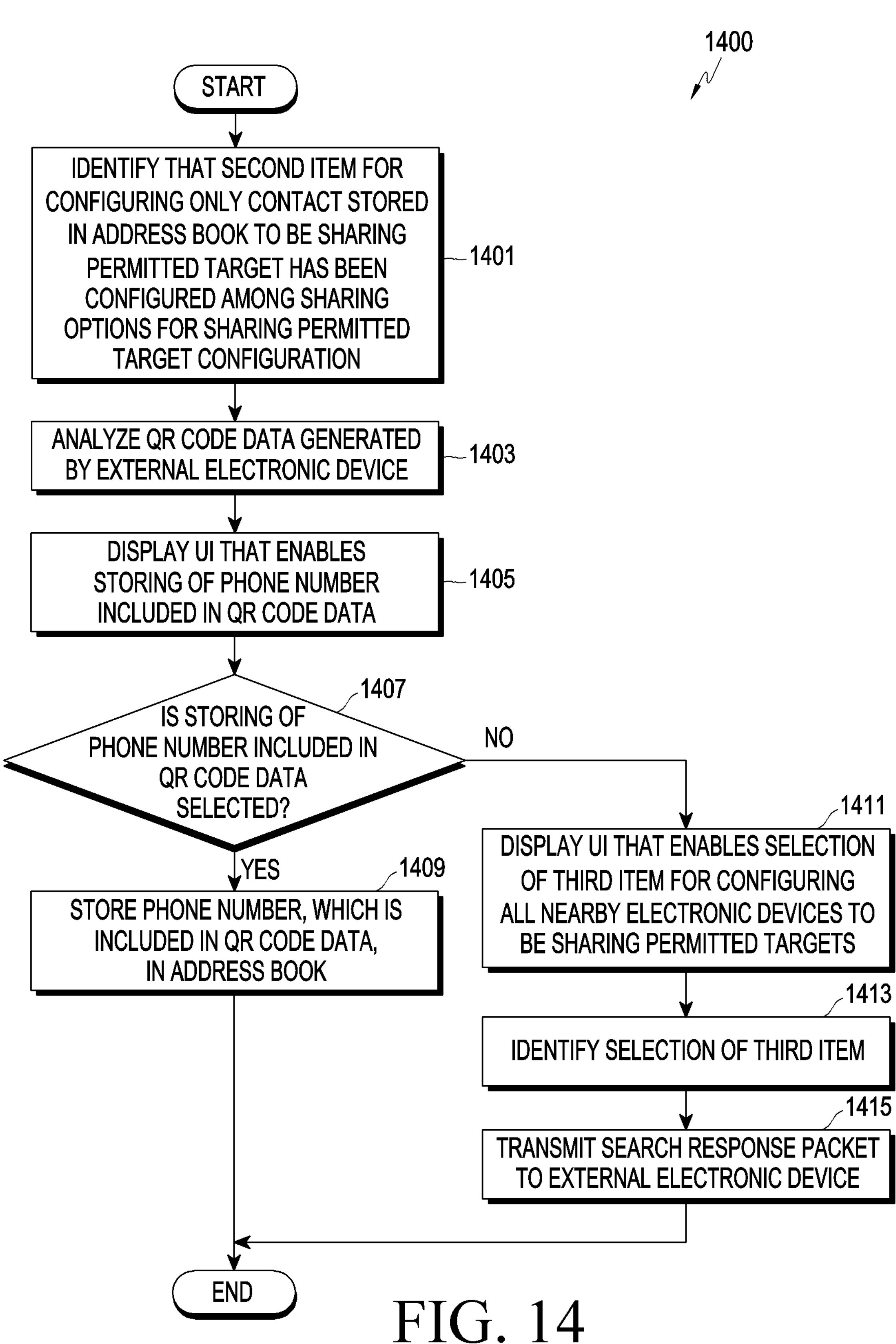
FIG. 14 is a flowchart for illustrating a file transmission operation in an electronic device according to an embodiment of the disclosure.

FIG. 14 is a flowchart for illustrating file transmission operations according to an embodiment of the disclosure. The file transmission operations may include operations 1401 to 1415. In the following embodiments, the respective operations may be sequentially performed, but are not necessarily performed sequentially. For example, the order of the respective operations may be changed, at least two actions may be performed in parallel, or another operation may be added.

Referring to FIG. 14, in a method 1400, in operation 1401, an electronic device (e.g., the second electronic device 401 of FIG. 2 and/or the second electronic device 401 of FIG. 4) may identify that a second item for configuring only a contact stored in an address book to be a sharing permitted target, among sharing options for sharing permitted target configuration, has been configured for the electronic device.

According to an embodiment, the sharing options enabling configuration as a sharing permitted target may include a first item for disabling a sharing permitted target (e.g., a state where all sharing permitted targets are turned off), a second item for configuring only a contact stored in an address book to be a sharing permitted target, and a third item for configuring all nearby electronic devices to be sharing permitted targets.

In operation 1403, the electronic device (e.g., the second electronic device 401 of FIG. 2 and/or the second electronic device 401 of FIG. 4) may analyze QR code data generated by an external electronic device (e.g., the first electronic device 301 of FIG. 2 and/or the first electronic device 301 of FIG. 3).

According to an embodiment, the electronic device may receive a packet for a QR code scan request, which has been broadcast by the external electronic device, via a Bluetooth low energy (BLE) communication module included in a communication module (e.g., the second communication module 490 of FIG. 4) of the electronic device.

According to an embodiment, when a QR code data scan function is enabled upon reception of the packet for the QR code scan request, the electronic device may scan the QR code data being displayed on a display (e.g., the first display 360 of FIG. 3) of the external electronic device, by using a camera (e.g., the second camera 480 of FIG. 4) of the electronic device.

According to an embodiment, the electronic device may parse and analyze the scanned QR code data.

In operation 1405, the electronic device (e.g., the second electronic device 401 of FIG. 2 and/or the second electronic device 401 of FIG. 4) may display a UI that induces storing of a phone number included in the QR code data.

According to an embodiment, in a state where the second item for configuring only a contact stored in an address book to be a sharing permitted target is currently configured for the electronic device, if it is identified that the phone number included in the QR code data is not included in an address book of the electronic device, the electronic device may display the UI that induces storing of the phone number included in the QR code data. If selection of storing the phone number included in the QR code data is identified in operation 1407, the electronic device (e.g., the second electronic device 401 of FIG. 2 and/or the second electronic device 401 of FIG. 4) may, in operation 1409, store the phone number, which is included in the QR code data, in the address book.

According to an embodiment, if the electronic device has been logged in to a server account, the electronic device may download, as certificate information, account information corresponding to the phone number included in the QR code data so as to update a buddy list of the electronic device.

According to an embodiment, in the second item for configuring only a contact stored in an address book to be a sharing permitted target, if the phone number included in the QR code data is stored in the address book, the electronic device may transmit a search response packet to the external electronic device (e.g., the first electronic device 301 of FIG. 2 and/or the first electronic device 301 of FIG. 3) via the Bluetooth low energy (BLE) communication module included in the communication module (e.g., the second communication module 490 of FIG. 4) of the electronic device.

According to an embodiment, the electronic device may receive connection information for file transmission during authentication with the external electronic device, establish a communication connection to the external electronic device by using a short-range communication technology (e.g., Wi-Fi-direct or Wi-Fi-aware) based on the connection information, and then receive a file from the external electronic device.

If selection of storing the phone number included in the QR code data cannot be identified in operation 1407, the electronic device (e.g., the second electronic device 401 of FIG. 2 and/or the second electronic device 401 of FIG. 4) may, in operation 1411, control the display (e.g., the second display 460) of the electronic device to display the UI enabling selection of the third item for configuring all nearby electronic devices to be sharing permitted targets.

If selection of the third item is identified in operation 1413, the electronic device (e.g., the second electronic device 401 of FIG. 2 and/or the second electronic device 401 of FIG. 4) may transmit a search response packet to the external electronic device (e.g., the first electronic device 301 of FIG. 2 and/or the first electronic device 301 of FIG. 3) in operation 1415.

According to an embodiment, the electronic device may transmit the search response packet to the external electronic device (e.g., the first electronic device 301 of FIG. 2 and/or the first electronic device 301 of FIG. 3) via the Bluetooth low energy (BLE) communication module included in the communication module (e.g., the second communication module 490 of FIG. 4) of the electronic device.

According to an embodiment, the electronic device may receive connection information for file transmission during authentication with the external electronic device, establish a communication connection to the external electronic device by using a short-range communication technology (e.g., Wi-Fi-direct or Wi-Fi-aware) based on the connection information, and then receive a file from the external electronic device.

Figure 15:
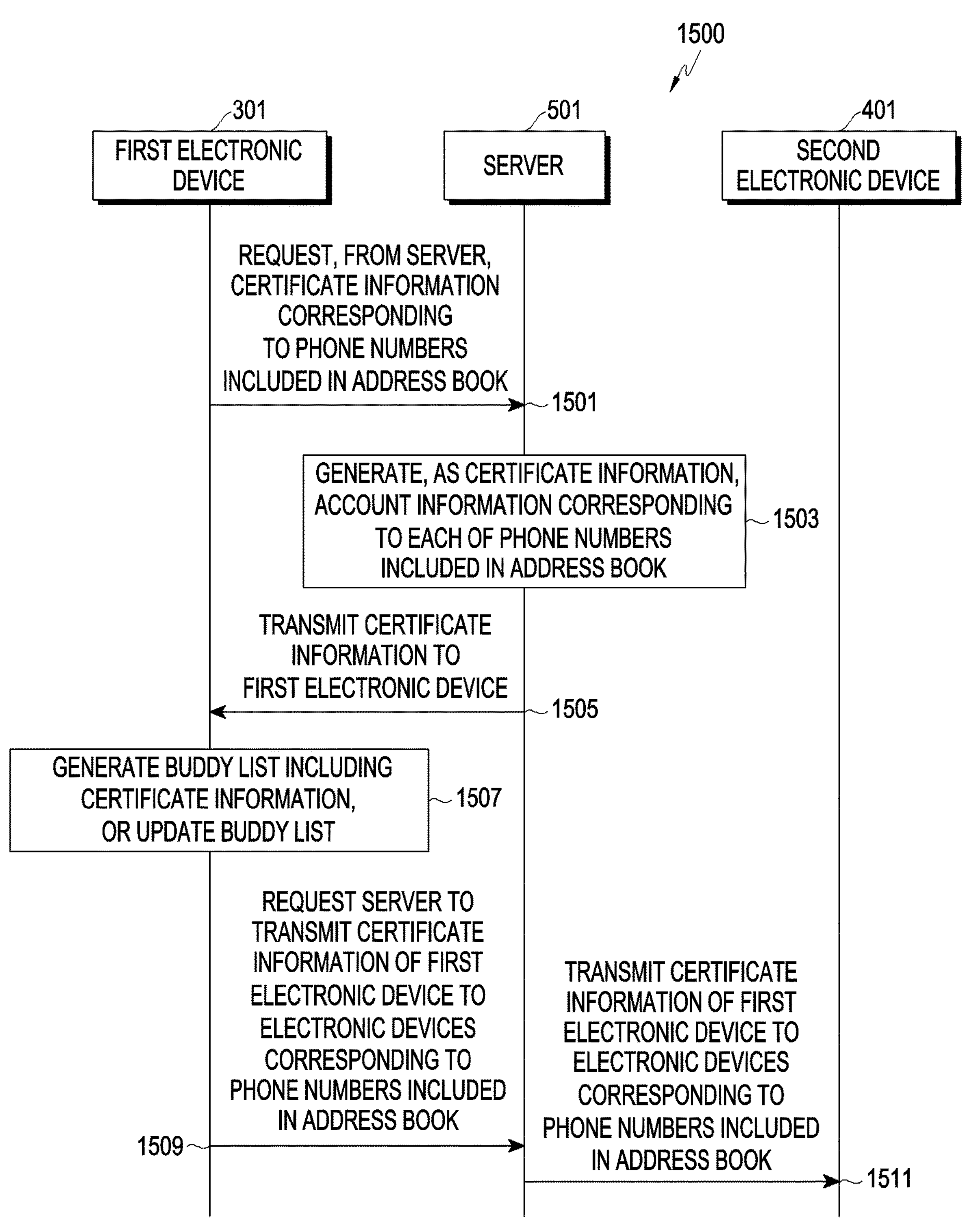
FIG. 15 is a flowchart for illustrating a certificate information downloading operation according to an embodiment of the disclosure.

FIG. 15 is a flowchart for illustrating certificate information downloading operations according to an embodiment of the disclosure. The certificate information downloading operations may include operations 1501 to 1511. In the following embodiments, the respective operations may be sequentially performed, but are not necessarily performed sequentially. For example, the order of the respective operations may be changed, at least two actions may be performed in parallel, or another operation may be added.

Referring to FIG. 15, in a method 1500, in operation 1501, the first electronic device 301 (e.g., the first electronic device 301 of FIG. 2 and/or the first electronic device 301 of FIG. 4) may request, from a server 501, certificate information corresponding to phone numbers included in an address book.

In operation 1503, the server 501 (e.g., the server 108 of FIG. 1) may generate, as certificate information, account information corresponding to each of the phone numbers included in the address book of the first electronic device.

In operation 1505, the server 501 (e.g., the server 108 of FIG. 1) may transmit the certificate information to the first electronic device.

In operation 1507, the first electronic device 301 (e.g., the first electronic device 301 of FIG. 2 and/or the first electronic device 301 of FIG. 4) may generate a buddy list including the certificate information or update the buddy list.

According to an embodiment, the first electronic device may generate or update the buddy list including the certificate information, which is synchronized with the address book including the phone numbers.

In operation 1509, the first electronic device 301 (e.g., the first electronic device 301 of FIG. 2 and/or the first electronic device 301 of FIG. 4) may request the server 501 to transmit the certificate information of the first electronic device to electronic devices corresponding to the phone numbers included in the address book.

In operation 1511, the server 501 (e.g., the server 108 of FIG. 1) may transmit the certificate information of the first electronic device to the electronic devices (e.g., the second electronic device 401) corresponding to the phone numbers included in the address book.

A file transmission method according to an embodiment may include, by a first electronic device, when a second electronic device for file transmission is not found, generating QR code data including information for changing the first electronic device to a sharing permitted target, and broadcasting a packet for a QR code scan request.

The file transmission method according to an embodiment may include, by the second electronic device, when the packet for the QR code scan request is received from the first electronic device, scanning the QR code data of the first electronic device, and based on analysis of the scanned QR code data, providing a UI configured to enable selection of a sharing option allowing the first electronic device to be configured as a sharing permitted target.

In the file transmission method according to an embodiment, the information for changing the first electronic device to the sharing permitted target, which is included in the QR code data, may include at least one of certificate information or a phone number.

The file transmission method according to an embodiment may further include, in a state where a first item for disabling a sharing permitted target has been configured among the sharing options for sharing permitted target configuration, providing, by the second electronic device, a UI configured to enable selection of a second item for configuring only a contact stored in an address book to be a sharing permitted target, based on a condition of satisfying at least one condition of a condition that the certificate information included in the QR code data exists in a buddy list of the second electronic device, a condition of identifying a user's selection to store the phone number, which is included in the QR code data, in an address book when the certificate information included in the QR code data does not exist in the buddy list of the second electronic device and the second electronic device has been logged in to a server account, or a condition that the phone number included in the QR code data exists in the address book when the certificate information included in the QR code data does not exist in the buddy list of the second electronic device and the second electronic device has not been logged in to the server account.

The file transmission method according to an embodiment may include, in a state where the second item for configuring only a contact stored in an address book to be a sharing permitted target is configured, storing, in the address book, the phone number included in the QR code data by the second electronic device if a condition of identifying the user's selection to store the phone number, which is included in the QR code data, in the address book is satisfied, and providing, by the second electronic device, the UI configured to enable selection of a third item for configuring all nearby electronic devices to be sharing permitted targets if the condition of identifying the user's selection to store the phone number, which is included in the QR code data, in the address book cannot be satisfied.

A file transmission method of an electronic device according to an embodiment may include broadcasting a search request packet for searching for an external electronic device for file transmission via communication circuitry of the electronic device.

The file transmission method of the electronic device according to an embodiment may include, if reception of a search response packet from the external electronic device fails, generating QR code data including information for changing the electronic device to a sharing permitted target.

The file transmission method of the electronic device according to an embodiment may include broadcasting a packet for a QR code scan request.

The file transmission method of the electronic device according to an embodiment may include controlling a display to display the generated QR code data.

In the file transmission method of the electronic device according to an embodiment, the information for changing the first electronic device to the sharing permitted target, which is included in the QR code data, may include at least one of certificate information or a phone number.

The file transmission method of the electronic device according to an embodiment may include, when the packet for the QR code scan request is received from the external electronic device via communication circuitry of the electronic device, scanning the QR code data of the external electronic device via a camera of the electronic device.

The file transmission method of the electronic device according to an embodiment may include, based on analysis of the scanned QR code data, controlling the display to provide a UI configured to enable selection of a sharing option allowing the external electronic device to be configured as a sharing permitted target.

The file transmission method of the electronic device according to an embodiment may further include, in a state where a first item for disabling a sharing permitted target has been configured among the sharing options for sharing permitted target configuration, providing the UI configured to enable selection of a second item for configuring only a contact stored in an address book to be a sharing permitted target, at satisfaction of at least one condition among a condition that the certificate information included in the QR code data exists in a buddy list of the second electronic device, a condition that the certificate information included in the QR code data does not exist in the buddy list of the second electronic device, the second electronic device has been logged in to a server account, and a user's selection to store the phone number, which is included in the QR code data, in an address book is identified, and a condition that the certificate information included in the QR code data does not exist in the buddy list of the second electronic device, the second electronic device has not been logged in to the server account, the phone number included in the QR code data exists in the address book.

The file transmission method of the electronic device according to an embodiment may further include, in the state where the first item for disabling a sharing permitted target has been configured among the sharing options for sharing permitted target configuration, providing the UI configured to enable selection of a third item for configuring all nearby electronic devices to be sharing permitted targets, upon satisfaction of at least one condition of a condition that the certificate information included in the QR code data does not exist in the buddy list of the second electronic device, the second electronic device has been logged in to the server account, and the user's selection to store the phone number, which is included in the QR code data, in the address book is not identified, or a condition that the certificate information included in the QR code data does not exist in the buddy list of the second electronic device, the second electronic device has not been logged in to the server account, and the phone number included in the QR code data does not exist in the address book.

The file transmission method of the electronic device according to an embodiment may further include, in a state where the second item for configuring only a contact stored in an address book to be a sharing permitted target is configured, if the condition of identifying the user's selection to store the phone number, which is included in the QR code data, in the address book is satisfied, storing, in the address book, the phone number included in the QR code data.

The file transmission method of the electronic device according to an embodiment may further include, if a condition of being unable to identify the user's selection to store the phone number, which is included in the QR code data, in the address book is satisfied, providing the UI configured to enable selection of the third item for configuring all nearby electronic devices to be sharing permitted targets.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101 or the electronic device 301). For example, a processor (e.g., the processor 520) of the machine (e.g., the electronic device 301) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to an embodiment of the disclosure, in a non-volatile storage medium which stores commands, the commands are configured to cause, when executed by an electronic device, the electronic device to perform at least one operation, wherein the at least one operation may include, by a first electronic device, when a second electronic device for file transmission is not found, generating QR code data including information for changing the first electronic device to a sharing permitted target, and broadcasting a packet for a QR code scan request, and a file transmission method according to an embodiment may include, by the second electronic device, when the packet for the QR code scan request is received from the first electronic device, scanning the QR code data of the first electronic device, and based on analysis of the scanned QR code data, providing a UI configured to enable selection of a sharing option allowing the first electronic device to be configured as a sharing permitted target.

According to an embodiment of the disclosure, in a non-volatile storage medium which stores commands, the commands are configured to cause, when executed by an electronic device, the electronic device to perform at least one operation, wherein the at least one operation may include broadcasting a search request packet for searching for an external electronic device for file transmission via communication circuitry of the electronic device, and if reception of a search response packet from the external electronic device fails, generating QR code data including information for changing the electronic device to a sharing permitted target.

According to an embodiment of the disclosure, in a non-volatile storage medium which stores commands, the commands are configured to cause, when executed by an electronic device, the electronic device to perform at least one operation, wherein the at least one operation may include, when a packet for a QR code scan request is received from an external electronic device via communication circuitry of the electronic device, scanning QR code data of the external electronic device via a camera of the electronic device, and based on analysis of the scanned QR code data, controlling a display to provide a UI configured to enable selection of a sharing option allowing the external electronic device to be configured as a sharing permitted target.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A file transmission system comprising:

a first electronic device configured to, in case that a second electronic device for file transmission is not found:

generate quick response (QR) code data comprising information for changing the first electronic device to a sharing permitted target, and prior to connection to the second electronic device, broadcast a packet for a QR code scan request, wherein the second electronic device is configured to, in case that the packet for the QR code scan request is received from the first electronic device:

scan the QR code data of the first electronic device, and based on analysis of the scanned QR code data, provide a user interface (UI) configured to enable selection of a sharing option allowing the first electronic device to be configured as a sharing permitted target.

2. The file transmission system of claim 1, wherein the second electronic device is configured to, in a state where a first item for disabling a sharing permitted target has been configured among sharing options for sharing permitted target configuration, provide the UI configured to enable selection of a second item for configuring only a contact stored in an address book as a sharing permitted target, based on a condition of satisfying at least one of a condition that certificate information included in the QR code data exists in a buddy list of the second electronic device, a condition that a user's selection to store a phone number, which is included in the QR code data, in an address book is identified in case that the certificate information included in the QR code data does not exist in the buddy list of the second electronic device and the second electronic device has been logged in to a server account, or a condition that the phone number included in the QR code data exists in the address book in case that the certificate information included in the QR code data does not exist in the buddy list of the second electronic device and the second electronic device has not been logged in to the server account.

3. The file transmission system of claim 2, wherein the second electronic device is configured to:

in a state where the second item for configuring only a contact stored in an address book as a sharing permitted target has been configured, store the phone number, which is included in the QR code data, in the address book in case of satisfying the condition that the user's selection to store the phone number, which is included in the QR code data, in the address book is identified; and provide the UI configured to enable selection of a third item for configuring all nearby electronic devices as sharing permitted targets, in case of not satisfying the condition that the user's selection to store the phone number, which is included in the QR code data, in the address book is identified.

4. An electronic device comprising:

communication circuitry;

a display;

memory storing one or more computer programs; and one or more processors communicatively coupled to the communication circuitry, the display, and the memory, wherein the one or more computer programs include computer-executable instructions that, when executed by the one or more processors individually or collectively, cause the electronic device to:

broadcast a search request packet for searching for an external electronic device for file transmission via the communication circuitry, and in case that reception of a search response packet from the external electronic device fails:

generate quick response (QR) code data comprising information for changing the electronic device to a sharing permitted target, prior to connection to an external electronic device, broadcast a packet for a QR code scan request, and control the display to display the generated QR code data.

5. The electronic device of claim 4, wherein the information for changing the electronic device to the sharing permitted target, which is included in the QR code data, comprises at least one of certificate information or a phone number.

6. An electronic device comprising:

communication circuitry;

a camera;

a display;

memory storing one or more computer programs; and one or more processors communicatively coupled to the communication circuitry, the camera, the display, and the memory, wherein the one or more computer programs include computer-executable instructions that, when executed by the one or more processors individually or collectively, cause the electronic device to:

in case that the electronic device is not connected to an external electronic device and a packet for a quick response (QR) code scan request is received from the external electronic device via the communication circuitry, scan QR code data of the external electronic device via the camera, and based on analysis of the scanned QR code data, control the display to provide a user interface (UI) configured to enable selection of a sharing option allowing the external electronic device to be configured as a sharing permitted target.

7. The electronic device of claim 6, wherein the one or more computer programs further include computer-executable instructions that, when executed by the one or more processors individually or collectively, cause the electronic device to:

in a state where a first item for disabling a sharing permitted target has been configured among sharing options for sharing permitted target configuration, provide the UI configured to enable selection of a second item for configuring only a contact stored in an address book as a sharing permitted target, in case of satisfying at least one condition among a condition that certificate information included in the QR code data exists in a buddy list of the electronic device, a condition that the certificate information included in the QR code data does not exist in the buddy list of the electronic device, the electronic device has been logged in to a server account, and a user's selection to store a phone number, which is included in the QR code data, in an address book is identified, and a condition that the certificate information included in the QR code data does not exist in the buddy list of the electronic device, the electronic device has not been logged in to the server account, the phone number included in the QR code data exists in the address book.

8. The electronic device of claim 7, wherein the one or more computer programs further include computer-executable instructions that, when executed by the one or more processors individually or collectively, cause the electronic device to:

in the state where the first item for disabling a sharing permitted target has been configured among the sharing options for sharing permitted target configuration, provide the UI configured to enable selection of a third item for configuring all nearby electronic devices as sharing permitted targets, in case of satisfying at least one condition among a condition that the certificate information included in the QR code data does not exist in the buddy list of the electronic device, the electronic device has been logged in to the server account, and the user's selection to store the phone number, which is included in the QR code data, in the address book is not identified, or a condition that the certificate information included in the QR code data does not exist in the buddy list of the electronic device, the electronic device has not been logged in to the server account, and the phone number included in the QR code data does not exist in the address book.

9. The electronic device of claim 8, wherein the one or more computer programs further include computer-executable instructions that, when executed by the one or more processors individually or collectively, cause the electronic device to:

in a state where the second item for configuring only a contact stored in an address book as a sharing permitted target has been configured, store the phone number, which is included in the QR code data, in the address book in case of satisfying the condition the user's selection to store the phone number, which is included in the QR code data, in the address book is identified; and provide the UI configured to enable selection of the third item for configuring all nearby electronic devices to be sharing permitted targets, in case of satisfying the condition that the user's selection to store the phone number, which is included in the QR code data, in the address book is not identified.

10. A file transmission method performed by an electronic device, the file transmission method comprising:

broadcasting, by the electronic device, a search request packet for searching for an external electronic device for file transmission via communication circuitry of the electronic device;

in case that reception of a search response packet from the external electronic device fails, generating, by the electronic device, quick response (QR) code data comprising information for changing the electronic device to a sharing permitted target;

prior to connection to an external electronic device, broadcasting, by the electronic device, a packet for a QR code scan request; and controlling, by the electronic device, a display to display the generated QR code data.

11. The method of claim 10, wherein the information for changing the electronic device to the sharing permitted target, which is included in the QR code data, comprises at least one of certificate information or a phone number.

12. A file transmission method performed by an electronic device, the file transmission method comprising:

in case that the electronic device is not connected to an external electronic device and a packet for a quick response (QR) code scan request is received from the external electronic device via communication circuitry of the electronic device, scanning, by the electronic device, QR code data of the external electronic device via a camera of the electronic device; and based on analysis of the scanned QR code data, controlling, by the electronic device, a display to provide a user interface (UI) configured to enable selection of a sharing option allowing the external electronic device to be configured as a sharing permitted target.

13. The method of claim 12, further comprising:

in a state where a first item for disabling a sharing permitted target has been configured among sharing options for sharing permitted target configuration, providing the UI configured to enable selection of a second item for configuring only a contact stored in an address book as a sharing permitted target, in case of satisfying at least one condition among a condition that certificate information included in the QR code data exists in a buddy list of the electronic device, a condition that the certificate information included in the QR code data does not exist in the buddy list of the electronic device, the electronic device has been logged in to a server account, and a user's selection to store a phone number, which is included in the QR code data, in an address book is identified, and a condition that the certificate information included in the QR code data does not exist in the buddy list of the electronic device, the electronic device has not been logged in to the server account, the phone number included in the QR code data exists in the address book.

14. The method of claim 13, further comprising:

in the state where the first item for disabling a sharing permitted target has been configured among the sharing options for sharing permitted target configuration, providing the UI configured to enable selection of a third item for configuring all nearby electronic devices as sharing permitted targets, in case of satisfying at least one condition among a condition that the certificate information included in the QR code data does not exist in the buddy list of the electronic device, the electronic device has been logged in to the server account, and the user's selection to store the phone number, which is included in the QR code data, in the address book is not identified, or a condition that the certificate information included in the QR code data does not exist in the buddy list of the electronic device, the electronic device has not been logged in to the server account, and the phone number included in the QR code data does not exist in the address book.

15. The method of claim 14, further comprising:

in a state where the second item for configuring only a contact stored in an address book to be a sharing permitted target has been configured, storing the phone number, which is included in the QR code data, in the address book in case of satisfying the condition that the user's selection to store the phone number, which is included in the QR code data, in the address book is identified; and providing the UI configured to enable selection of the third item for configuring all nearby electronic devices to be sharing permitted targets, in case of satisfying the condition that the user's selection to store the phone number, which is included in the QR code data, in the address book is identified.

16. One or more non-transitory computer-readable storage media storing one or more computer programs including computer-executable instructions that, when executed by one or more processors of an electronic device individually or collectively, cause the electronic device to perform operations, the operations comprising:

broadcasting, by the electronic device, a search request packet for searching for an external electronic device for file transmission via communication circuitry of the electronic device;

in case that reception of a search response packet from the external electronic device fails:

generating, by the electronic device, quick response (QR) code data comprising information for changing the electronic device to a sharing permitted target;

prior to the electronic device being connected to another electronic device, broadcasting, by the electronic device, a packet for a QR code scan request; and controlling, by the electronic device, a display to display the generated QR code data.

17. The one or more non-transitory computer-readable storage media of claim 16, wherein the information for changing the electronic device to the sharing permitted target, which is included in the QR code data, comprises at least one of certificate information or a phone number.

* * * * *